United States Patent
Yano et al.

[11] Patent Number: 6,048,390
[45] Date of Patent: Apr. 11, 2000

[54] INK JET RECORDING INK AND INK JET RECORDING METHOD

[75] Inventors: Toshiyuki Yano; Hitoshi Kojima; Eisuke Hiraoka; Akihiko Chujo; Hiromi Nagai; Kaoru Watanabe; Yasuharu Endo; Ken Hashimoto, all of Minami-Ashigara, Japan

[73] Assignee: Fuji Xerox Co., Ltd., Tokyo, Japan

[21] Appl. No.: 08/891,794

[22] Filed: Jul. 15, 1997

[30] Foreign Application Priority Data

Jul. 17, 1996 [JP] Japan .................................. 8-187930

[51] Int. Cl.⁷ .................................................. C09D 11/02
[52] U.S. Cl. .................................... 106/31.43; 106/31.52; 106/31.47; 106/31.48; 106/31.49; 106/31.5; 106/31.58
[58] Field of Search .............................. 106/31.43, 31.47, 106/31.48, 31.49, 31.5, 31.52, 31.58

[56] References Cited

U.S. PATENT DOCUMENTS

| | | | |
|---|---|---|---|
| 5,062,893 | 11/1991 | Adamic et al. | 106/31.43 |
| 5,254,159 | 10/1993 | Gundlach et al. | 106/31.43 |
| 5,451,251 | 9/1995 | Mafune et al. | 106/31.43 |
| 5,462,590 | 10/1995 | Yui et al. | 106/31.43 |
| 5,478,383 | 12/1995 | Nagashima et al. | 106/31.43 |

FOREIGN PATENT DOCUMENTS

| | | |
|---|---|---|
| A-2-29687 | 1/1990 | Japan . |
| A-2-255876 | 10/1990 | Japan . |
| A-3-91577 | 4/1991 | Japan . |
| A-4-226175 | 8/1992 | Japan . |
| A-4-233975 | 8/1992 | Japan . |
| A-4-270286 | 9/1992 | Japan . |
| A-4-279671 | 10/1992 | Japan . |
| A-6-93196 | 4/1994 | Japan . |
| A-6-220386 | 8/1994 | Japan . |
| A-7-26178 | 1/1995 | Japan . |
| A-7-150086 | 6/1995 | Japan . |
| A-7-166116 | 6/1995 | Japan . |
| A-7-238247 | 9/1995 | Japan . |
| A-7-238264 | 9/1995 | Japan . |
| A-7-268262 | 10/1995 | Japan . |
| A-8-41398 | 2/1996 | Japan . |

*Primary Examiner*—Helene Klemanski
*Attorney, Agent, or Firm*—Oliff & Berridge, PLC

[57] ABSTRACT

An ink jet recording ink including water, a water-soluble organic solvent, and at least one dye having at least one carboxyl group in the form of a free acid, wherein at least one compound selected form secondary or tertiary amine compounds represented by the following general formula (I) and at least one compound selected from the alkali metal hydroxides are contained and the pH value thereof is from 8.5 to 12:

$$R^1 - \underset{\underset{R^3}{|}}{\overset{\overset{R^2}{|}}{N}} \quad (I)$$

wherein one or two of $R^1$, $R^2$, and $R^3$ are an alkyl group having 1 to 5 carbon atoms in the alkyl chain and substituted by a substituent selected from a carboxyl group, a sulfonic group, an alkali metal salt of a carboxyl group, and an alkali metal salt of a sulfonic group; and the remainder is a group selected from a hydrogen atom, an alkyl group having 1 to 5 carbon atoms, and a substituted alkyl group having 1 to 5 carbon atoms in the alkyl chain and substituted by a hydroxyl group or carbamoyl group is disclosed. The ink provides water resistance and various properties required for an ink jet recording ink.

17 Claims, 1 Drawing Sheet

INK JET RECORDING INK AND INK JET RECORDING METHOD

BACKGROUND OF THE INVENTION

1. Field of the Invention

The present invention relates to an ink jet recording ink used for an ink jet recording apparatus and to an ink jet recording method.

2. Description of the Related Art

In ink jet recording theory, a liquid or molten solid ink is discharged through nozzles, slits, a porous film, and the like for recording on paper, cloth, film, and the like to record images. Various methods for discharging an ink are suggested, such as a so-called charge-control method in which an ink is discharged using an electrostatic attractive force, a so-called drop-on-demand method (pressure-pulse method) in which an ink is discharged using vibration pressure of a piezoelectric element, and a so-called thermal ink jet method in which an ink is discharged using a pressure generated by forming and growing bubbles at a high temperature, and the like. Images having extremely high resolution can be obtained using these methods.

The ink used in these ink jet recording methods include an aqueous dye ink obtained by dissolving various water-soluble dyes in a liquid medium composed of water and a water-soluble organic solvent, an aqueous pigment ink obtained by dispersing various pigments in a liquid medium composed of water and a water-soluble organic solvent, an oil-based dye ink obtained by dissolving an oil-soluble dye in an organic solvent, and the like.

Among these inks, an aqueous ink containing an aqueous dye dissolved is most frequently used as an ink jet recording ink. The first reason thereof is that the main solvent is water and therefore the aqueous ink is safe. Moreover, the second reason is that the color-developing property of a color image is excellent and a printed image of high quality is obtained because a dye is used. Further, the third reason is that the ink has excellent storage stability.

However, in the case of an aqueous ink using an aqueous dye as a coloring agent, water resistance of an printed image is poor.

To improve water resistance of such an aqueous dye, various studies and developments have been made.

For example, Japanese Patent Application Laid-Open (JP-A) Nos. 2-29687 and 2-255876 suggest a method for improving water resistance of an ink by adding a polyamine to the ink. However, in the case of such an ink, the dissolution stability of a dye is easily lowered due to mutual action with a polyamine, and viscosity is easily increased because of the reaction of a polyamine over time. Therefore, clogging easily occurs and discharge stability of an ink easily deteriorates.

Further, Japanese Patent Application Laid-Open (JP-A) Nos. 3-91577, 4-226175, 4-233975, 4-270286, 4-279671, and 6-93196 suggest a method for improving water resistance of an ink by using a dye having a carboxyl group. However, in the case of such an ink, the dissolubility of a dye is lowered because of the vaporization of water and/or an ammonium ion which is a counter ion, and clogging easily occurs and preservability of an ink tends to be lowered. Further, in the case of such an ink, a printed image becomes bronzed, which easily reduces print quality. Further, in the case of thermal ink jet recording, deposition on the surface of a heater referred to as so-called "kogation" is easily formed and a change in the discharge ability of an ink increases over time.

To improve the above-described problems occurring with the increase in water resistance, in Japanese Patent Application Laid-Open (JP-A) No. 4-226175, there are suggested a method in which dyes whose structure is similar to each other are mixed, a method in which a pH buffering agent is added to an ink, and a method in which a phosphate is added. However, in these cases, even though pH can be stably maintained, improvement in clogging is not sufficient, and improvement in kogation which is problematical in thermal ink jet recording is also insufficient.

Also, Japanese Patent Application Laid-Open (JP-A) No. 7-26178 suggests a method in which an alkali metal compound is added to an ink. However, even though such an ink can improve clogging if the storage period is short, when the ink is stored for a long time, the dissolvability of a dye is decreased, and ink storage stability deteriorates. Further, the ink cannot improve kogation which is problematical in thermal ink jet recording.

Further, Japanese Patent Application Laid-Open (JP-A) No. 7-150086 suggests an ink containing a combination of a dye comprising an ammonium ion as a counter ion and an organic amine. However, the organic amine as exemplified tends to corrode a recording head material, jetting frequency response is lowered, a solid image becomes faint and white streaks are generated. Further, the ink cannot improve kogation which is problematical in thermal ink jet recording.

Further, Japanese Patent Application Laid-Open (JP-A) Nos. 7-166116, 7-238264, 7-238247, and 7-268262 suggest an ink containing a combination of an amine compound, a specific dye, urea or a derivative thereof, a substituted automatic compound, and the like. However, primary or second amine compounds as exemplified tend to cause failure of a heater contained in a recording head because such amine compounds have high chemical activity and easily corrode the recording head material, and tertiary amine compounds as exemplified easily decrease the amount of an ink to be discharged, downgrade the jetting frequency response, makes a solid image faint, and generate white streaks because they have a high molecular weight and therefore increase ink viscosity even if the amount of tertiary amine compound added is small and the viscosity increasing ratio when water is evaporated is high. Further, the ink cannot improve kogation which is problematical in thermal ink jet recording.

Further, Japanese Patent Application Laid-Open (JP-A) No. 8-41398 suggests an ink containing a combination of a specific aminoalkylsulfonic acid, glycine, and an alkali metal hydroxide. However, in this case, responsiveness for pulses applied to the recording head, a solid image becomes faint and white streaks are generated. Further, the ink cannot improve kogation which is problematical in thermal ink jet recording.

As a method for improving the above-described kogation, Japanese Patent Application Laid-Open (JP-A) No. 6-220386 suggests controlling the pH of an ink between 6 and 8 using the amine compound represented by general formula (I), below. However, when pH is controlled between 6 and 8 using a dye having a carboxyl group, kogation is not improved sufficiently, a printed image becomes bronzed, clogging easily occurs.

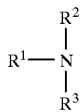

As described above, no ink jet recording ink has been obtained which has superior water resistance and provides the various abilities required of an ink jet recording ink.

SUMMARY OF THE INVENTION

The object of the present invention is to provide an ink jet recording ink which has superior water resistance, which provides a good image quality, which does not cause "bronzing", which is excellent in long-term ink storage stability, which has sufficient nozzle clogging resistance, which has sufficient jetting frequency response, which does not reduce the amount discharged by kogation, and which does not corrode or degrade parts coming in contact with ink such as a recording head and the like, and to provide an ink jet recording method using this ink.

The present inventors have studied the foregoing intensively and have found that the above-described object can be accomplished by an ink jet recording ink comprising water, a water-soluble organic solvent, and at least one dye having at least one carboxyl group in the form of a free acid, wherein at least one compound selected from secondary or tertiary amine compounds represented by general formula (I) and at least one compound selected from alkali metal hydroxides are contained and the pH value thereof is from 8.5 to 12, and an ink jet recording method in which this ink jet recording ink is used and droplets thereof are discharged from an orifice according to recording signals to record images, and the present invention has been completed.

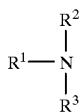

wherein, one or two of $R^1$, $R^2$ and $R^3$ are an alkyl group having 1 to 5 carbon atoms in the alkyl chain and substituted by a substituent selected from a carboxyl group, a sulfonic group, an alkali metal salt of a carboxyl group, and an alkali metal salt of a sulfonic group, and the remainder is a group selected from a hydrogen atom, an alkyl group having 1 to 5 carbon atoms, and a substituted alkyl group having 1 to 5 carbon atoms in the alkyl chain and substituted by a hydroxyl group or carbamoyl group.

Though the action mechanism of the present invention is not known in detail, the mechanism we have surmised is as follows: A dye having a carboxyl group has high water resistance, but its free acid has relatively low solubility in water, and when the dye concentration increases by partial water evaporation at the tip of a nozzle or by reduction of water in an ink cartridge because of long-term storage, the dye easily precipitates. However, an ink of the present invention can retain solubility sufficient for practical use, even if a small amount of water evaporates. The reason for this is assumed to be that, even if water evaporates, ink pH of 8.5 to 12 and the use of the combination of an amine compounds, an alkali metal hydroxide, and a dye having a carboxyl group prevents or delays precipitation of the dye and therefore can suppress clogging of nozzles and the like.

This is particularly true in the case in which the counter ion of the dye is a volatile ion such as ammonium and the like.

Further, the reason for the occurrence of "bronzing" of a printed image which is formed by an ink containing a dye having a carboxyl group is believed to be that the ink pH rapidly decreases when the ink deposited on paper dries and the dye rapidly precipitates. However, according to the present invention, the ink pH of 8.5 to 12 and the use of the combination of a specific amine compound, an alkali metal hydroxide, and a dye having a carboxyl group provide pH buffering action which can inhibit the sudden reduction of ink pH when ink dries, and can prevent bronzing.

Further, the reason for the occurrence of kogation which is problematical in thermal ink jet recording is believed to be that ionic dissociation of water in an ink occurs due to rapid increase in temperature near a heater, and therefore the hydrogen ion concentration of the ink partially increases, and, as a result, the free acid of a dye having a carboxyl group forms and the dye precipitates. However, according to the present invention, ink pH of 8.5 to 12 and the use of the combination of a specific amine compound, and alkali metal hydroxide, and a dye having a carboxyl group enable the amine compound to bond rapidly with the generated hydrogen ion. Moreover, many alkali metal ions, which are generated due to the dissociation of the alkali metal hydroxide in the ink, having a strong ionic strength exist near the dye ion, resulting in preventing the ion dissociation equilibrium of the dye having a carboxyl group from shifting to the free acid side. Therefore, kogation can be prevented.

The amine compound used in the ink of the present invention is either a secondary or tertiary one. When an ink contains a primary amine compound such as glycine, kogation increases because the primary amine compound is believed to self-react and become insoluble.

The carbon number of an alkyl chain of a substituted or an unsubstituted alkyl group which is a substituent of the amine compound used in the ink of the present invention is 5 or less. When an ink contains an amine compound substituted by an alkyl group having an alkyl chain composed of 6 or more carbon atoms, the ink cannot decrease kogation because such amine compound has lower solubility in an ink and easily burns on a heater.

Further, the use of the combination of a specific amine compound, alkali metal hydroxide, and a dye having a carboxyl group, and ink pH of 8.5 to 12 can inhibit the foaming of an ink, and therefore can prevent dropout of a portion of an image due to nozzle clogging which is caused by foam generated in printing. This effect tends to decrease as the carbon number of the alkyl chain of the substituent of the amine compound increases, and an amine compound having an alkyl group whose alkyl chain is composed of 6 or more carbon atoms cannot provide such an effect.

DETAILED DESCRIPTION OF THE PREFERRED EMBODIMENTS

Figure 1A:
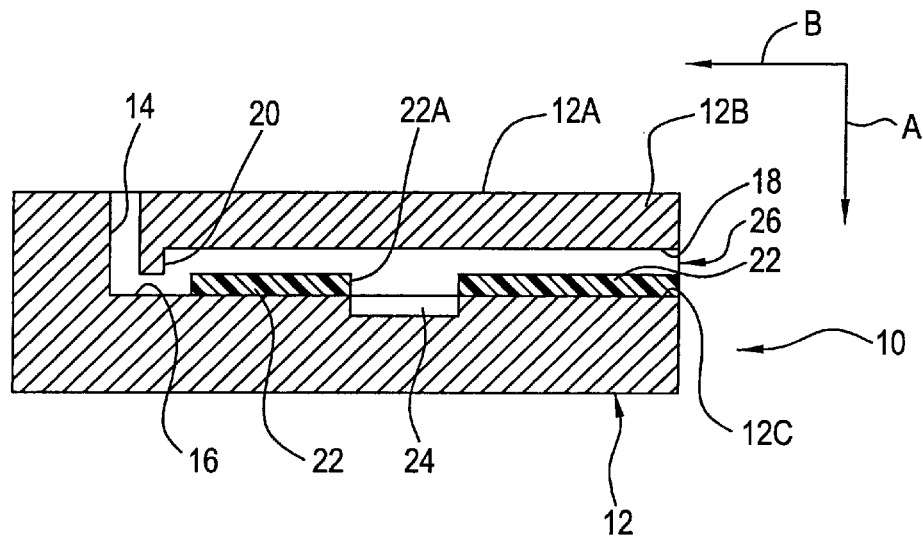
FIG. 1A is a cross-sectional view in which a recording head used in a thermal ink jet recording apparatus to which the present invention is applied is cut along the direction of depth of the head.

The present invention will be described in detail below.

The dye used in the present invention is a dye having at least one carboxyl group which is in the form of a free acid. Examples of the counter ion of the dye include, but are not limited to, sodium ion, lithium ion, potassium ion, ammonium ion, alkanol ammonium ion such as triethanol ammonium ion and the like, and similar. At least one ammonium ion is preferably contained as the counter ion from the viewpoint of improvement of water resistance. Preferable chemical structures of dyes in the form of a free acid are represented by general formulas (II) to (VII). As metal contained in the phthalocyanine nuclei of general formulas (III) and (VI), Ni, Cu, Fe, Ti, V, and the like are preferable, and Cu is the most preferable. The preferable substituent R in dyes represented by general formulas (III) to (VII) include H, an alkyl group having 1 to 5 carbon atoms, and a substituted alkyl group having 1 to 5 carbon atoms in the alkyl chain and substituted by a hydroxyl group or carboxyl group. The dyes represented by the general formulas (VIII) to (XI) are further preferable.

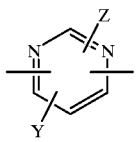
(2)

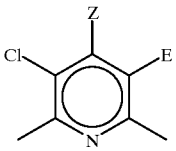
(3)

wherein in formulas (1) to (3), Z is $NR^4R^5$, $SR^6$, or $OR^6$; Y is hydrogen, chlorine, Z, $SR^7$, or $OR^7$; E is chlorine or a cyano group; $R^4$ and $R^5$ are each independently hydrogen, an alkyl group, substituted alkyl group, aryl group, substituted aryl group, aralkyl group, or substituted aralkyl group, or a group constituting a 5- or 6-member ring together with a nitrogen atom; and $R^6$ and $R^7$ are each independently hydrogen, an alkyl group, substituted alkyl group, aryl group, substituted aryl group, aralkyl group, or substituted aralkyl group.

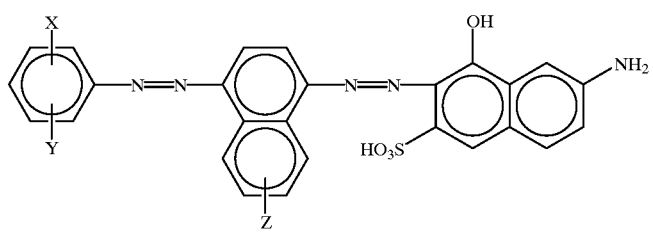
(II)

wherein X and Y are each hydrogen or a carboxyl group, Z is hydrogen, a carboxyl group or sulfonic group, and general formula (II) has one or more carboxyl groups.

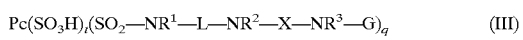
(III)

wherein Pc is a phthalocyanine nucleus containing metal; $R^1$, $R^2$, and $R^3$ are each independently hydrogen, an alkyl group, substituted alkyl group, alkenyl group, substituted alkenyl group, aralkyl group, or substituted aralkyl group; L is a divalent organic bonding group; X is a carbonyl group or a group represented by the following formulas (1) to (3); G is a colorless organic group substituted by one or two groups selected from a mercaptocarbonyl group or carboxyl group; t+q is 3 to 4; q is 1 or more; and general formula (III) has 1 or more carboxyl groups and 1 or more sulfonic groups; and the sum of the number of the mercaptocarboxyl group and the number of the carboxyl group is equal to or greater than the number of the sulfonic group.

(IV)

wherein J is a group represented by formula (1) described below; $Ar^1$ and $Ar^2$ are each independently an aryl group or substituted aryl group, at least one of $Ar^1$ and $Ar^2$ has at least one substituent selected from a mercaptocarbonyl group or carboxyl group; L is a divalent organic bonding group; X is a carbonyl group or a group represented by formulas (2) to (4) described below; and general formula (IV) has 1 or more carboxyl groups and 1 or more sulfonic groups and the sum of the number of the mercaptocarboxyl group and the number of carboxyl group is equal to or greater than the number of sulfonic group.

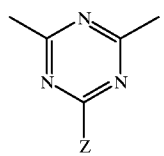
(1)

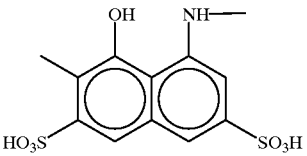
(1)

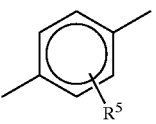
(1)

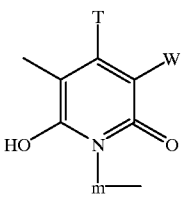
(2)

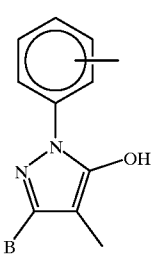
(3)

wherein in formulas (1) to (3), $R^5$ is a group selected from hydrogen, an alkyl group, substituted alkyl group, alkoxyhalogen, cyano group, ureido, or $NHCOR^6$; $R^6$ is hydrogen, an alkyl group, substituted alkyl group, aryl group, substituted aryl group, aralkyl group, or substituted aralkyl group; T is an alkyl group; W is a group selected from hydrogen, a cyano group, $CONR^{10}R^{11}$, pyridinium group, or carboxyl group; m is $C_2$ to $C_8$ alkylene chain; B is hydrogen, an alkyl group, or carboxyl group; and $R^{10}$ and $R^{11}$ are each independently hydrogen, an alkyl group, or substituted alkyl group.

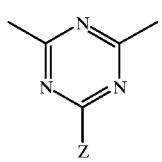
(2)

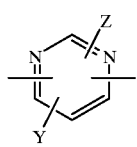
(3)

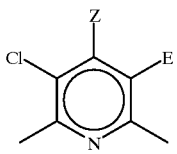
(4)

wherein, in formulas (2) to (4) Z is $NR^1R^2$, SR or $OR^3$, Y is hydrogen, chlorine, Z, $SR^4$ or $OR^4$; E is chlorine or a cyano group; $R^1$ and $R^2$ are each independently hydrogen, an alkyl group, substituted alkyl group, alkenyl group, substituted alkenyl group, aralkyl group, or substituted aralkyl group or a group constituting a 5- or 6-member ring together with a nitrogen atom; and $R^3$ and $R^4$ are each independently hydrogen, an alkyl group, substituted alkyl group, alkenyl group, substituted alkenyl group, aralkyl group, or substituted aralkyl group.

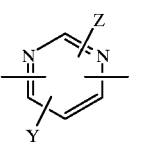
(4)

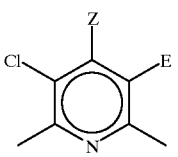
(5)

(6)

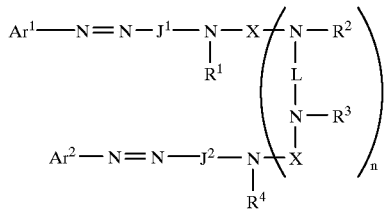
(V)

wherein $Ar^1$ and $Ar^2$ are each independently an aryl group or substituted aryl group; at least one of $Ar^1$ and $Ar^2$ has at least one substituent selected from a mercaptocarbonyl group or carboxyl group; $J^1$ and $J^2$ are each independently a group represented by formulas (1) to (3) described below; $R^1$, $R^2$, $R^3$, and $R^4$ are each independently hydrogen, an alkyl group, or substituted alkyl group; L is a divalent organic bonding group; n is 0 or 1; X is independently a carbonyl group or a group represented by formulas (4) to (6) described below; and general formula (V) has 1 or more carboxyl groups; and when general formula (V) does not have a sulfonic group, the sum of the number of the mercaptocarbonyl group and the number of the carboxyl group is two or more and when general formula (V) has a sulfonic group, the sum of the number of the mercaptocarboxyl group and the number of the carboxyl group is equal to or greater than the number of the sulfonic group.

wherein in formulas (4) to (6); Z is $OR^7$, $SR^7$, or $NR^8R^9$; Y is hydrogen, chlorine, or a cyano group; E is chlorine or a cyano group; $R^7$ is hydrogen, an alkyl group, substituted alkyl group, alkenyl group, substituted alkenyl group, aryl group, substituted aryl group, aralkyl group, or substituted aralkyl group; $R^8$ and $R^9$ are each independently hydrogen, an alkyl group, substituted alkyl group, alkenyl group, substituted alkenyl group, aryl group, substituted aryl group, aralkyl group or substituted aralkyl group, or a group constituting a 5- or 6-member ring together with a nitrogen atom.

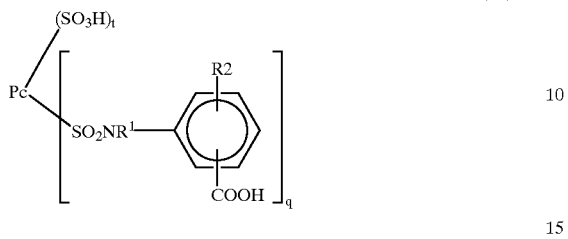

(VI)

wherein Pc is a phthalocyanine nucleus containing metal; $R^1$ is hydrogen, an alkyl group, substituted alkyl group, alkenyl group, substituted alkenyl group, aralkyl group, or substituted aralkyl group; $R^2$ is hydrogen, an alkyl group, alkoxy group, halogen group, amino group, or substituted amino group; t+q is 3 to 4; and q is 1 or more.

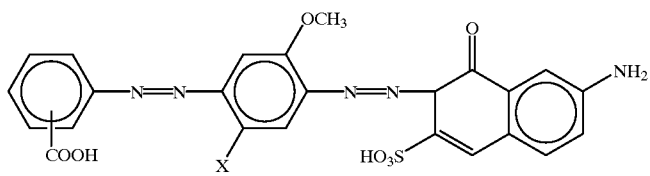

(VII)

wherein, X is hydrogen, a carboxyl group, sulfonic group, alkyl group, substituted alkyl group, alkenyl group, substituted alkenyl group, aralkyl group, or substituted aralkyl group.

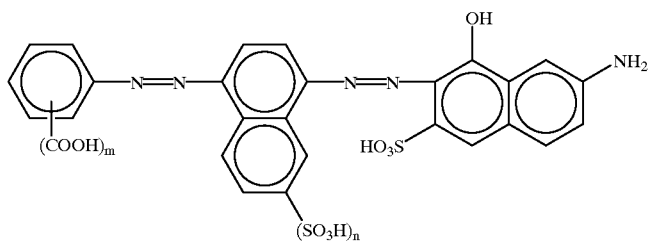

(VIII)

wherein m is 1 or 2, and n is 0 or 1.

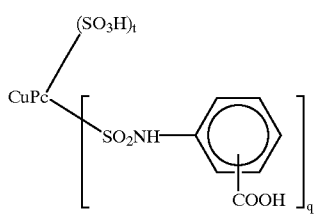

(IX)

wherein CuPc is a phthalocyanine nucleus containing copper, and t+q is 3 to 4.

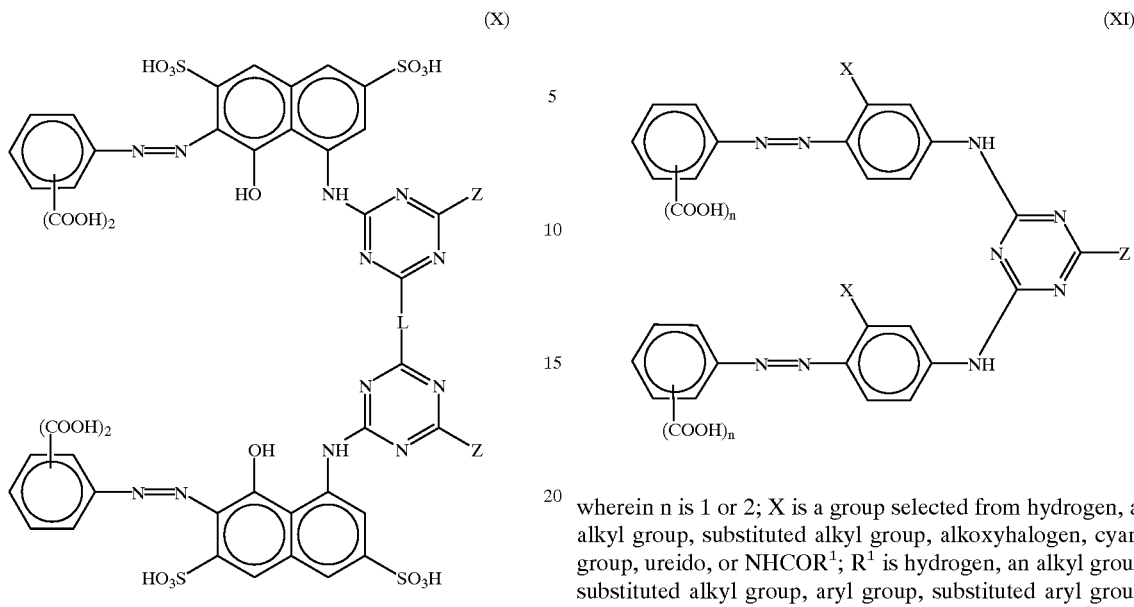

wherein L is a divalent organic bonding group, Z is $NR^1R^2$, $SR^3$, or $OR^3$; $R^1$ and $R^2$ are each independently hydrogen, and alkyl group, substituted alkyl group, alkenyl group, substituted alkenyl group, aralkyl group, or substituted aralkyl group or a group constituting a 5- or 6-member ring together with a nitrogen atom, and $R^3$ is hydrogen, an alkyl group, substituted alkyl group, alkenyl group, substituted alkenyl group, aralkyl group, or substituted aralkyl group.

wherein n is 1 or 2; X is a group selected from hydrogen, an alkyl group, substituted alkyl group, alkoxyhalogen, cyano group, ureido, or $NHCOR^1$; $R^1$ is hydrogen, an alkyl group, substituted alkyl group, aryl group, substituted aryl group, aralkyl group, or substituted aralkyl group; Z is $OR^2$, $SR^2$, or $NR^3R^4$; $R^2$ is hydrogen, an alkyl group, substituted alkyl group, alkenyl group, substituted alkenyl group, aryl group, substituted aryl group, aralkyl group, or substituted aralkyl group; $R^3$ and $R^4$ are each independently hydrogen, an alkyl group, substituted alkyl group, alkenyl group, substituted alkenyl group, aryl group, substituted aryl group, aralkyl group, or substituted aralkyl group or a group constituting a 5- or 6-member ring together with a nitrogen atom.

The specific examples of the preferred dyes shown below shall not be construed as a limitation upon those usable here.

compound (II-1)

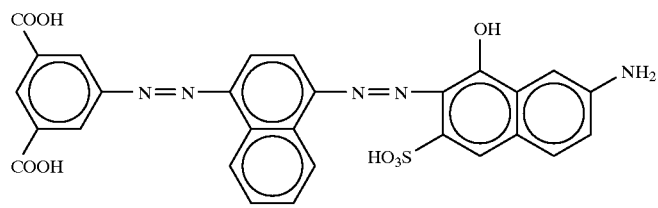

compound (II-2)

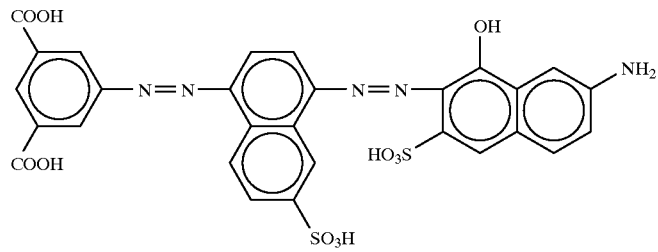

compound (II-3)

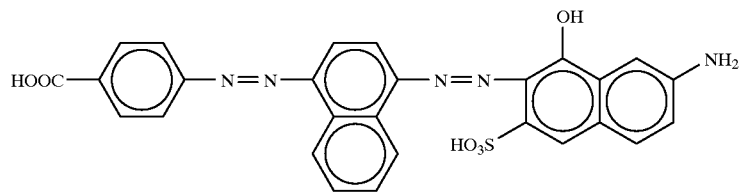

-continued
compound (II-4)
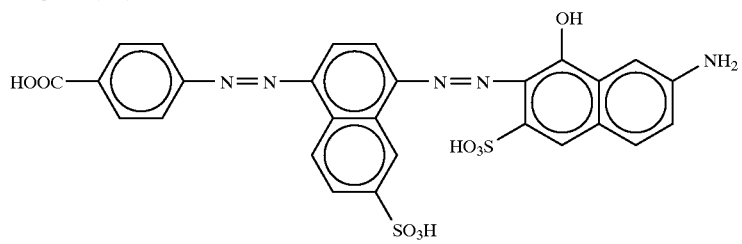
compound (II-5)
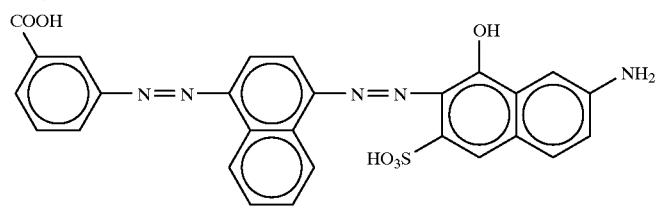
compound (II-6)
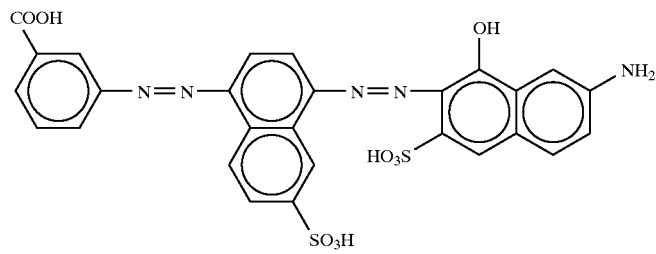
compound (III-1)
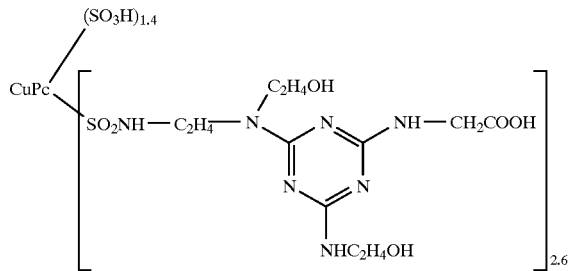
compound (III-2)
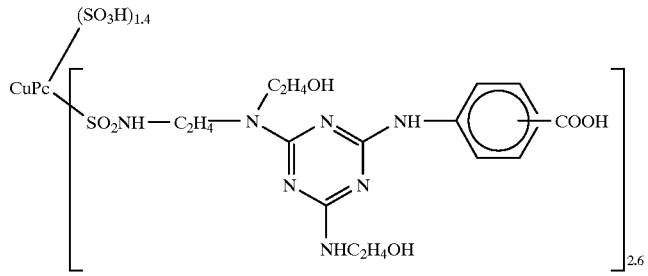

compound (III-3)
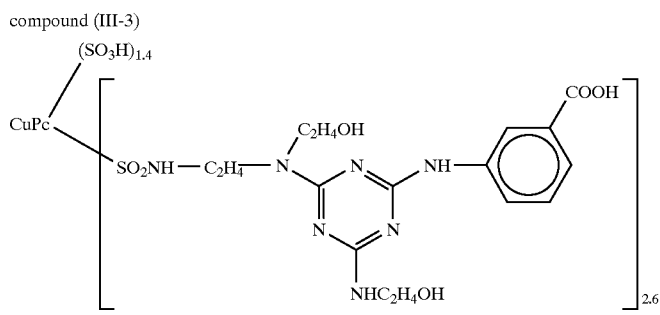
compound (III-4)
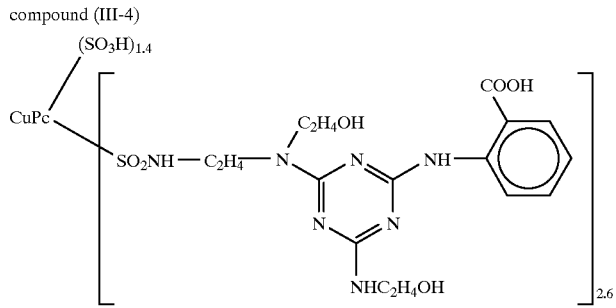
compound (III-5)
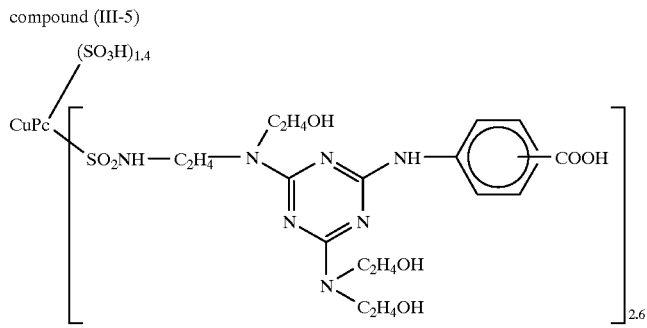
compound (III-6)
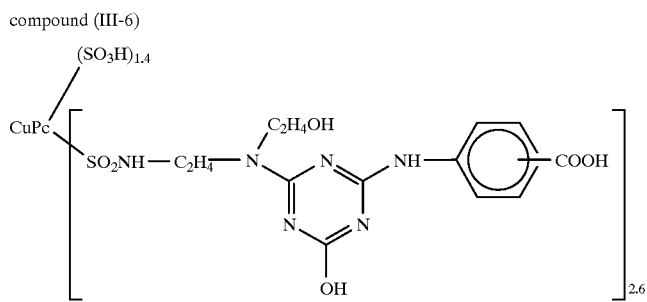
compound (III-7)
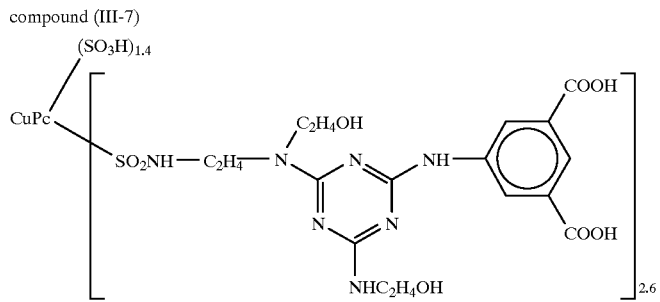

-continued
compound (III-8)
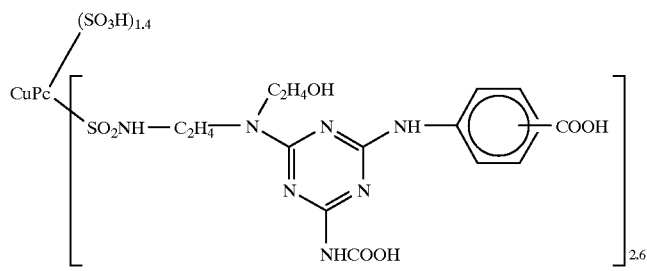
compound (III-9)
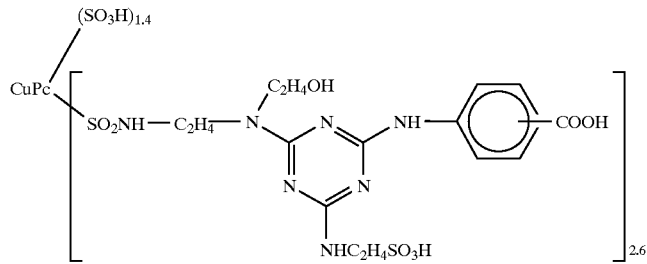
compound (III-10)
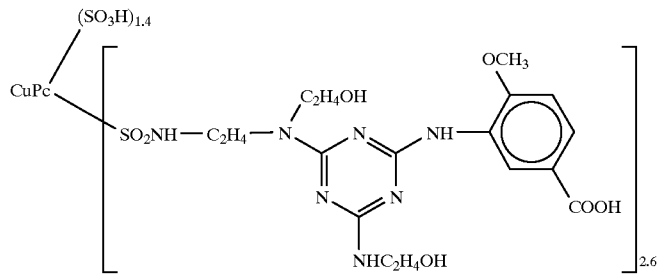
compound (III-11)
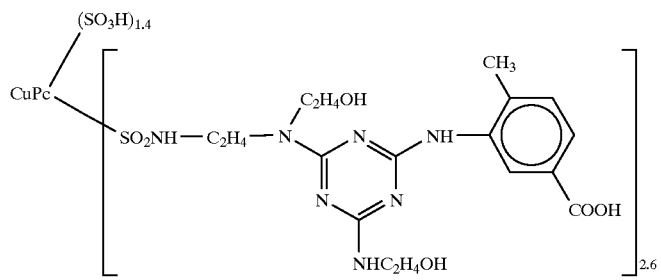
compound (III-12)
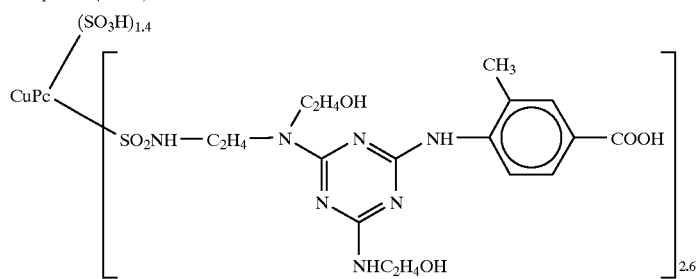

-continued
compound (III-13)
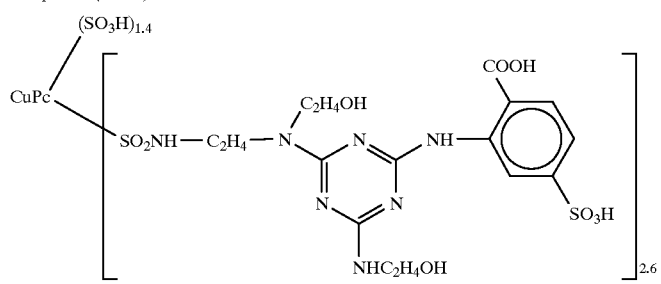
compound (III-15)
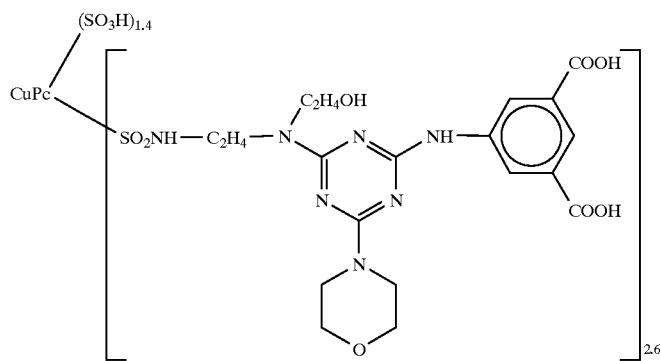
compound (III-16)
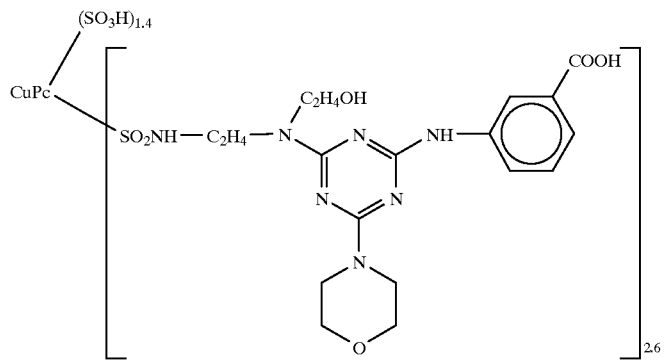
compound (III-17)
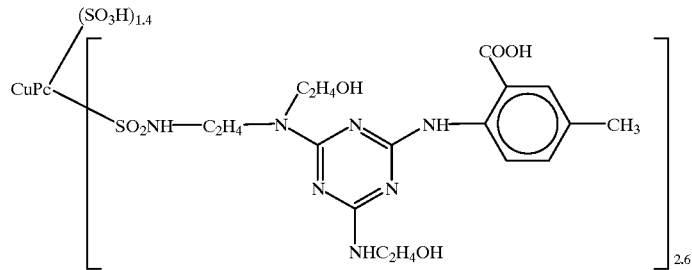

-continued
compound (III-18)
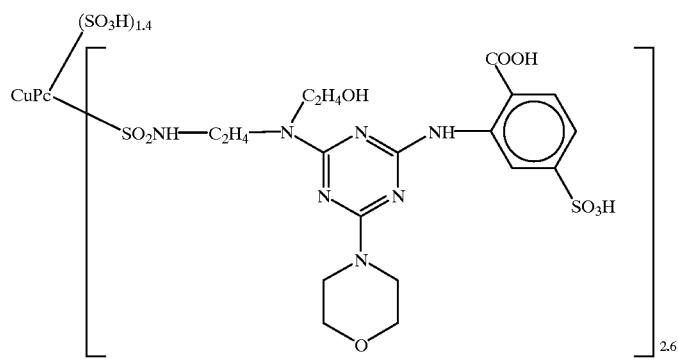
compound (III-19)
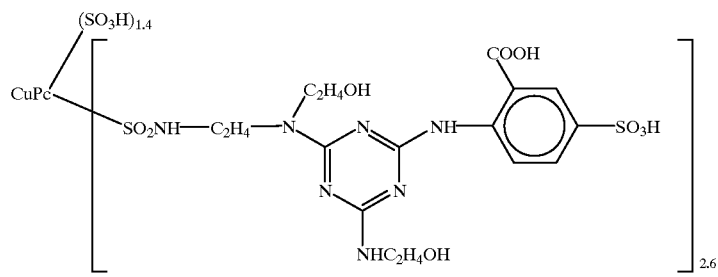
compound (III-20)
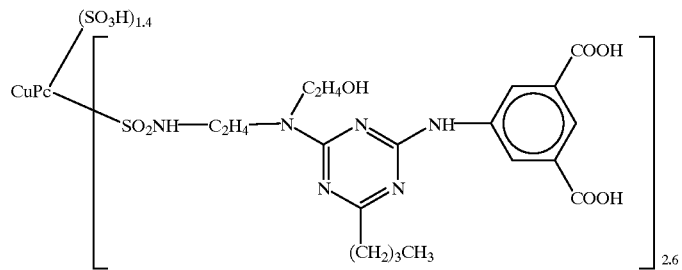

-continued
compound (IV-1)
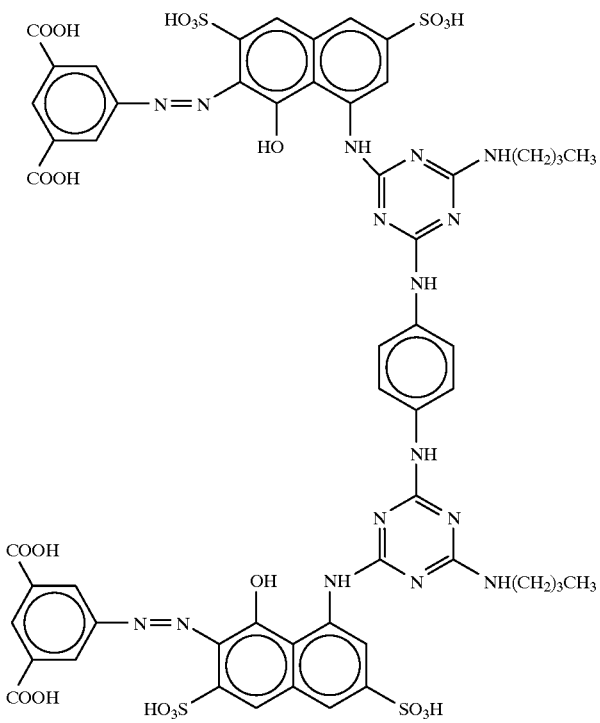
compound (IV-2)
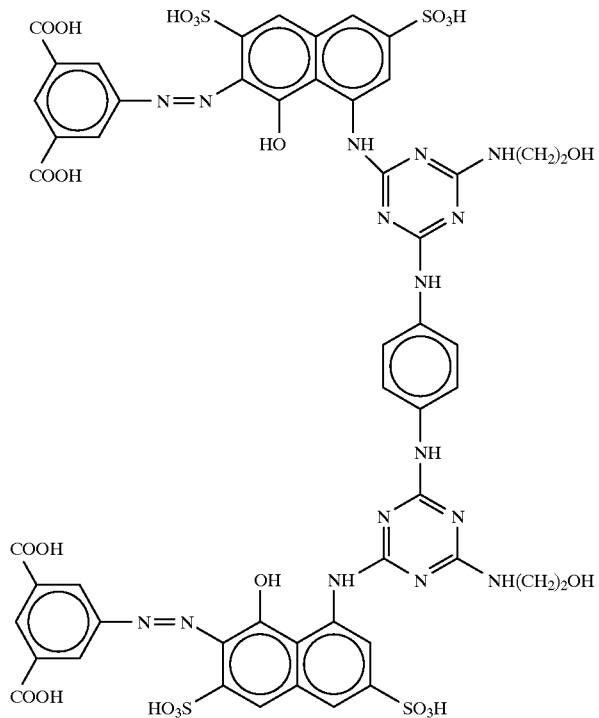

compound (IV-3)
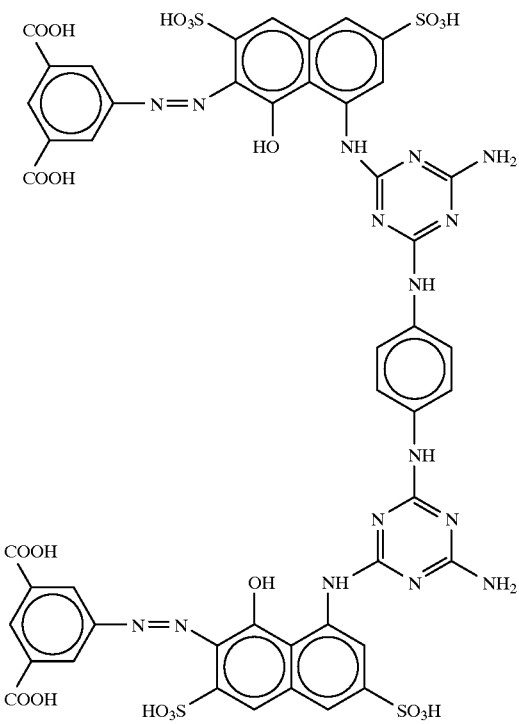
compound (IV-4)
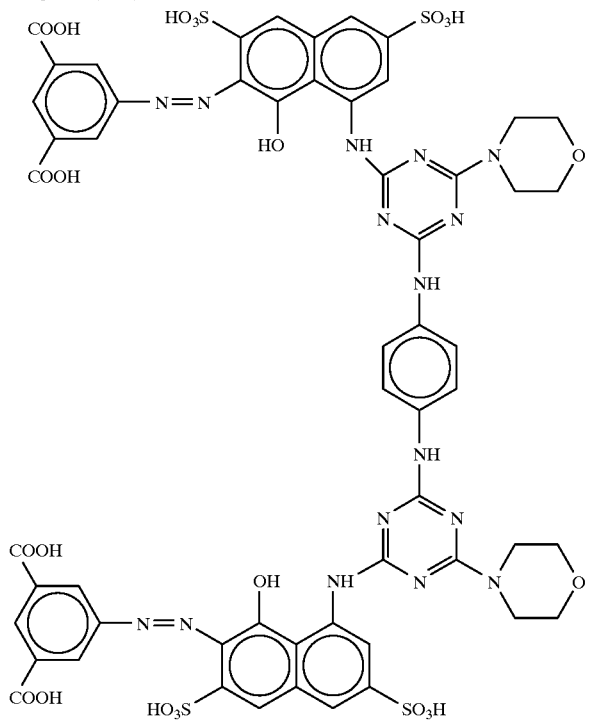

-continued
compound (IV-5)
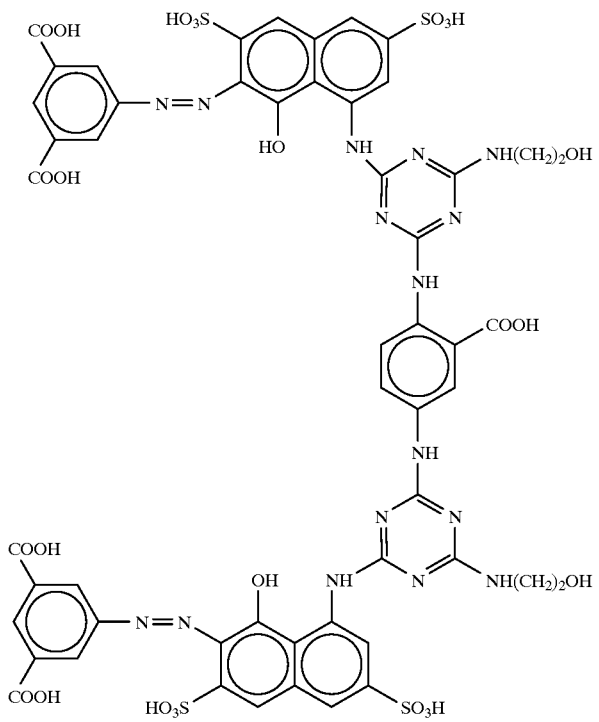
compound (IV-6)
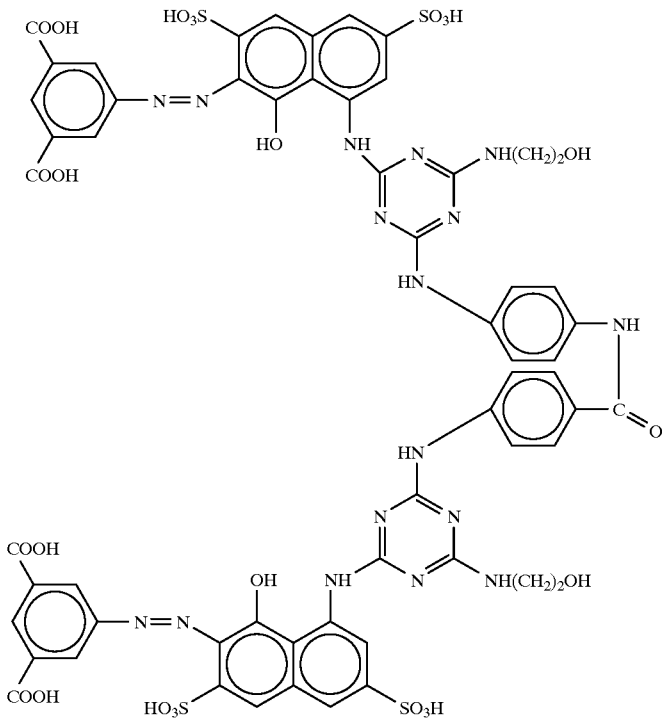

-continued
compound (IV-7)
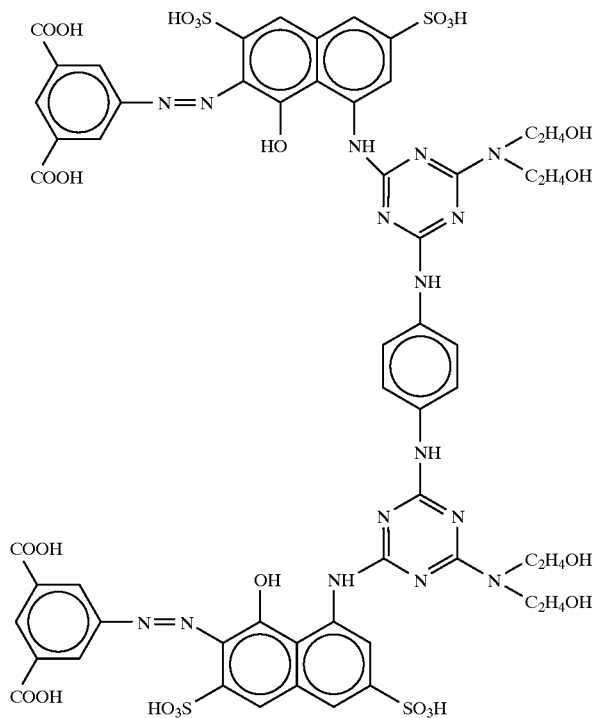
compound (IV-8)
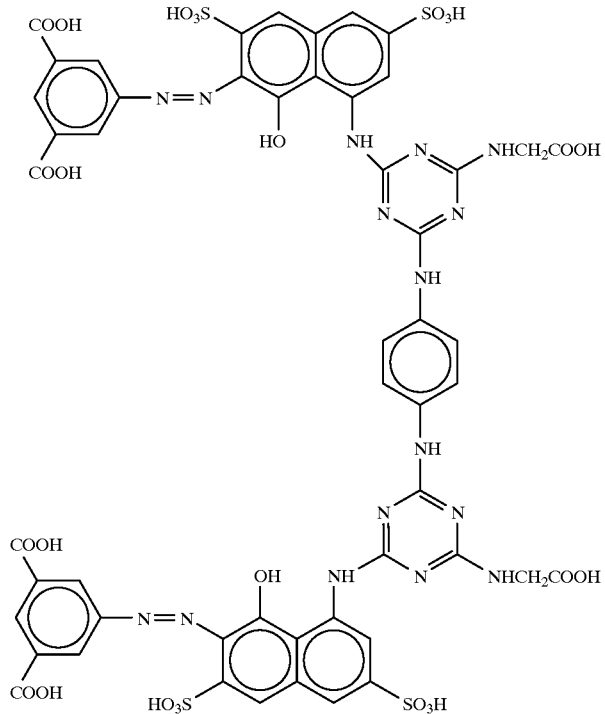

-continued
compound (IV-9)
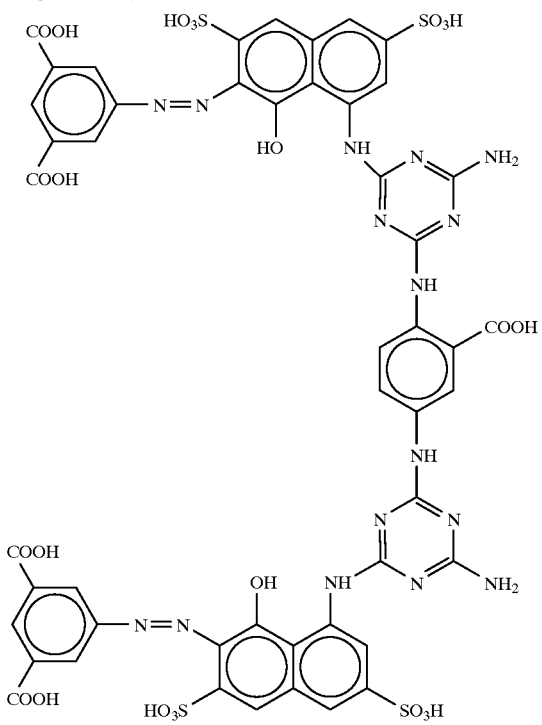
compound (IV-10)
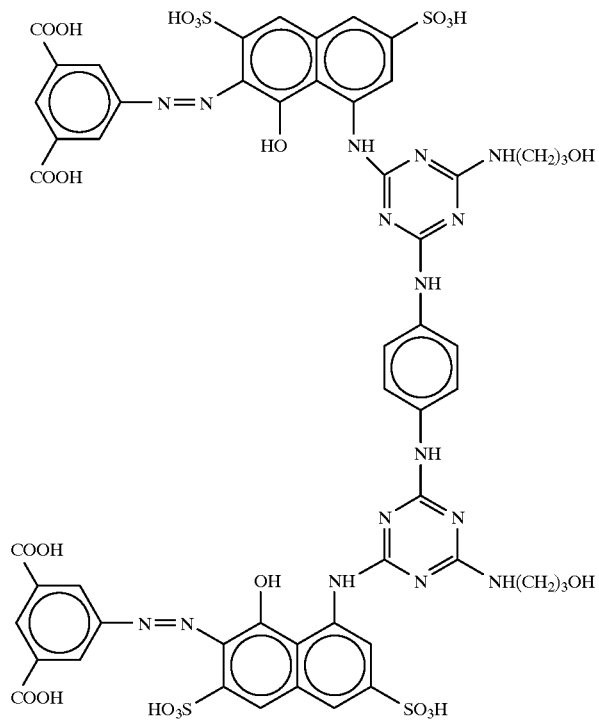

-continued
compound (IV-11)
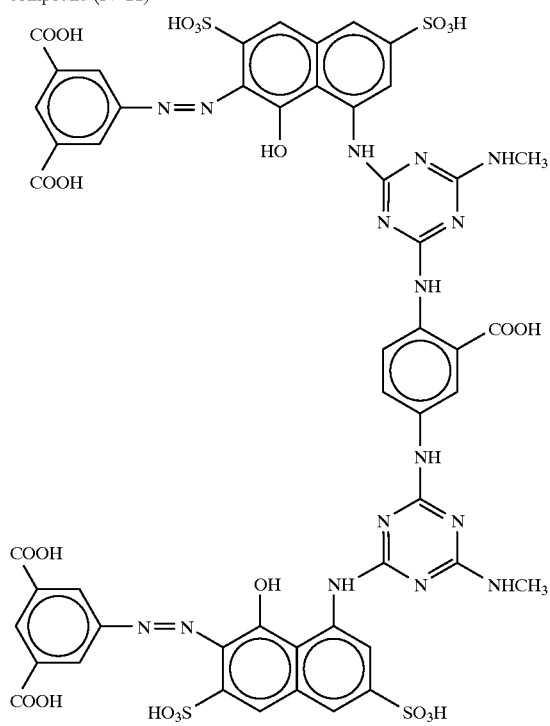
compound (IV-12)
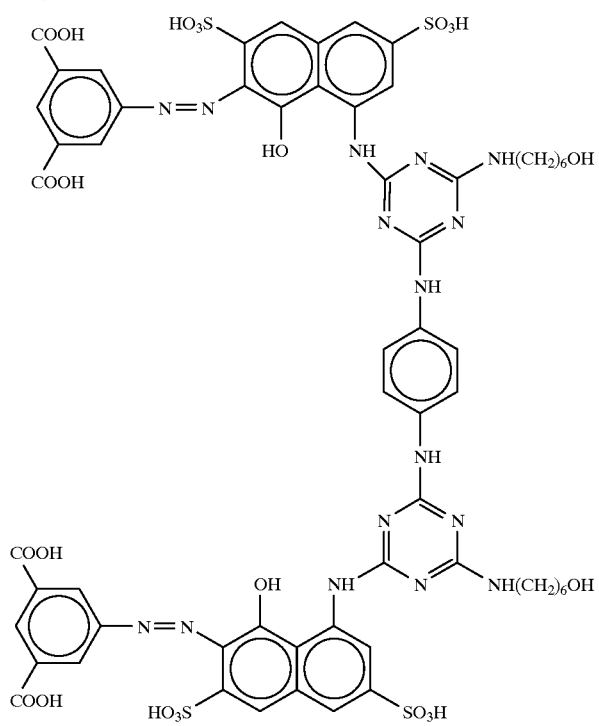

compound (IV-13)
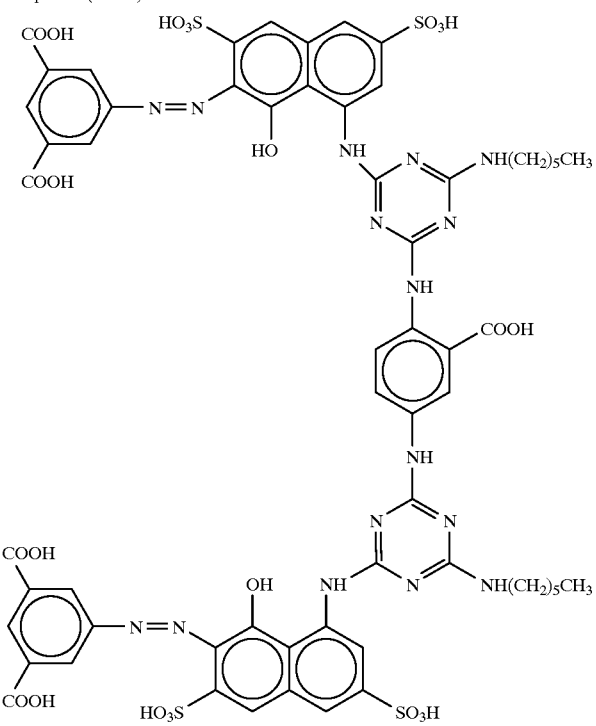
compound (IV-14)
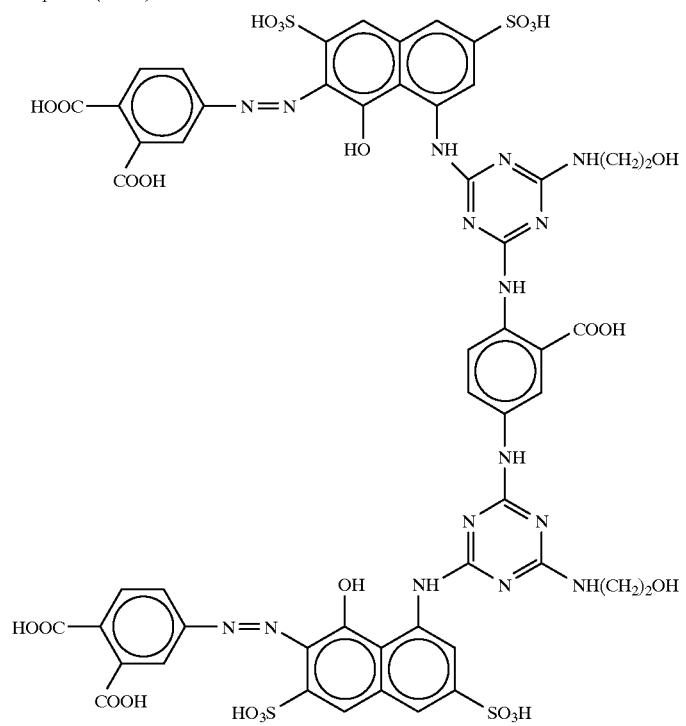
compound (IV-15)

-continued
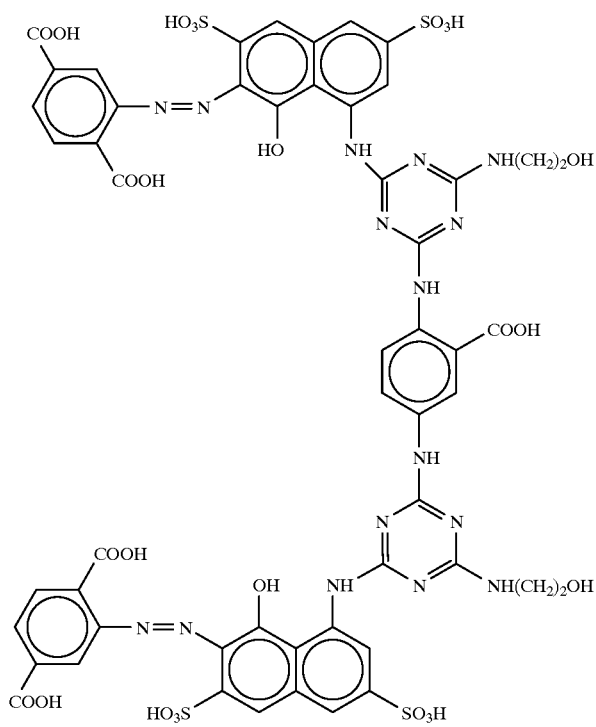
compound (IV-16)
compound (IV-17)
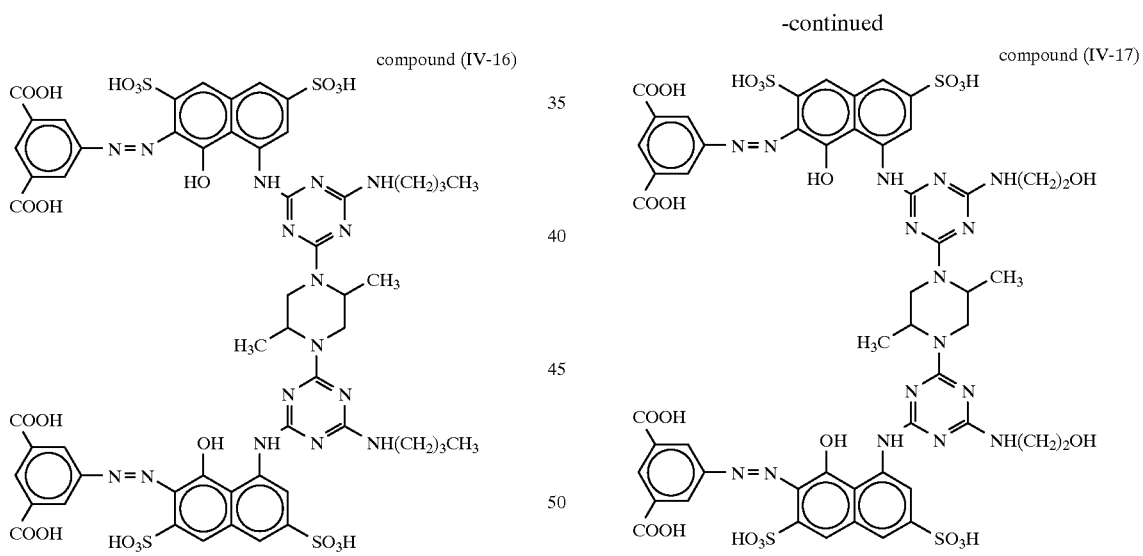

-continued
compound (IV-18)
compound (IV-19)
compound (IV-20)
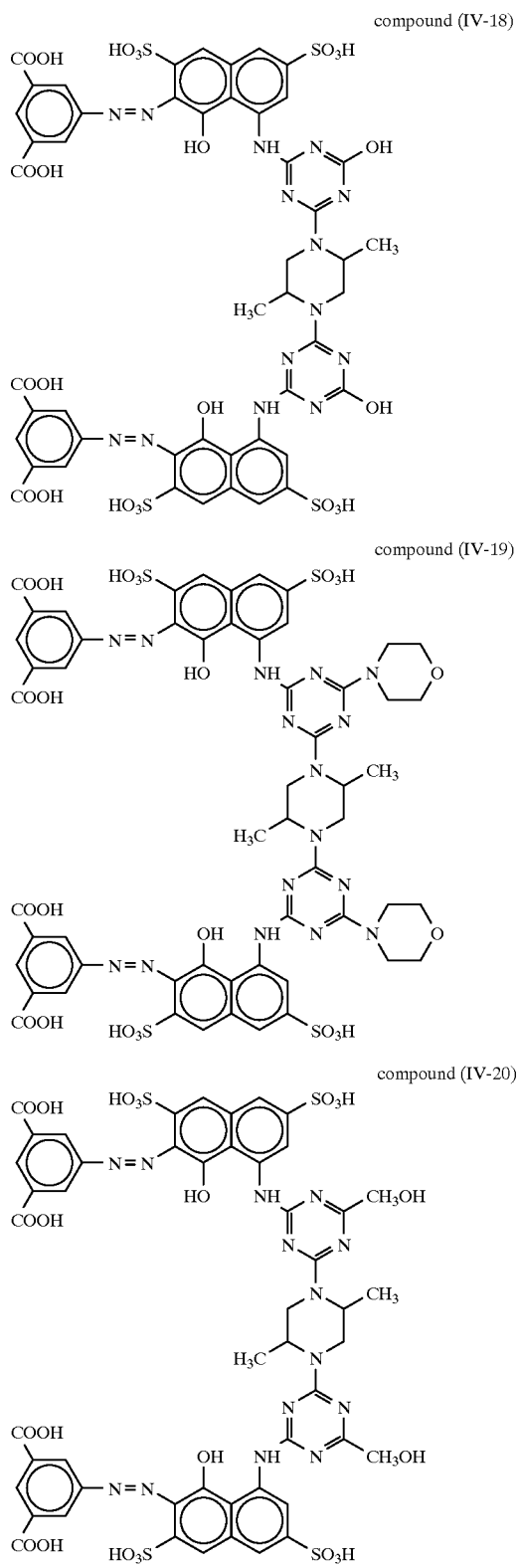
-continued
compound (IV-21)
compound (V-1)
compound (V-2)
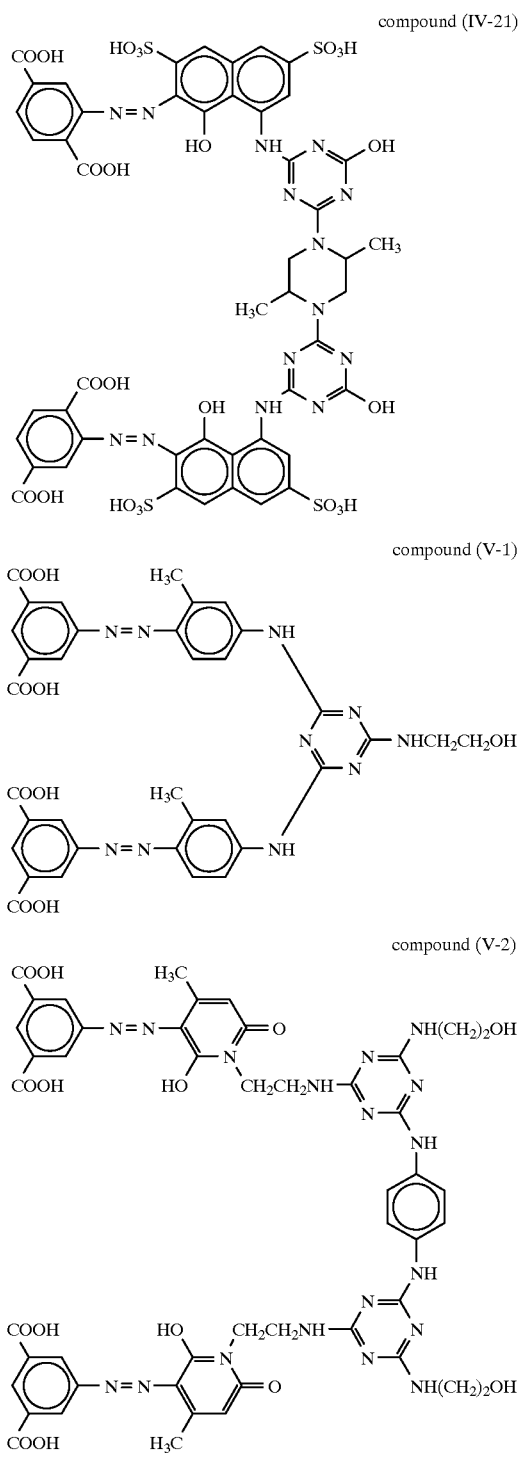

-continued
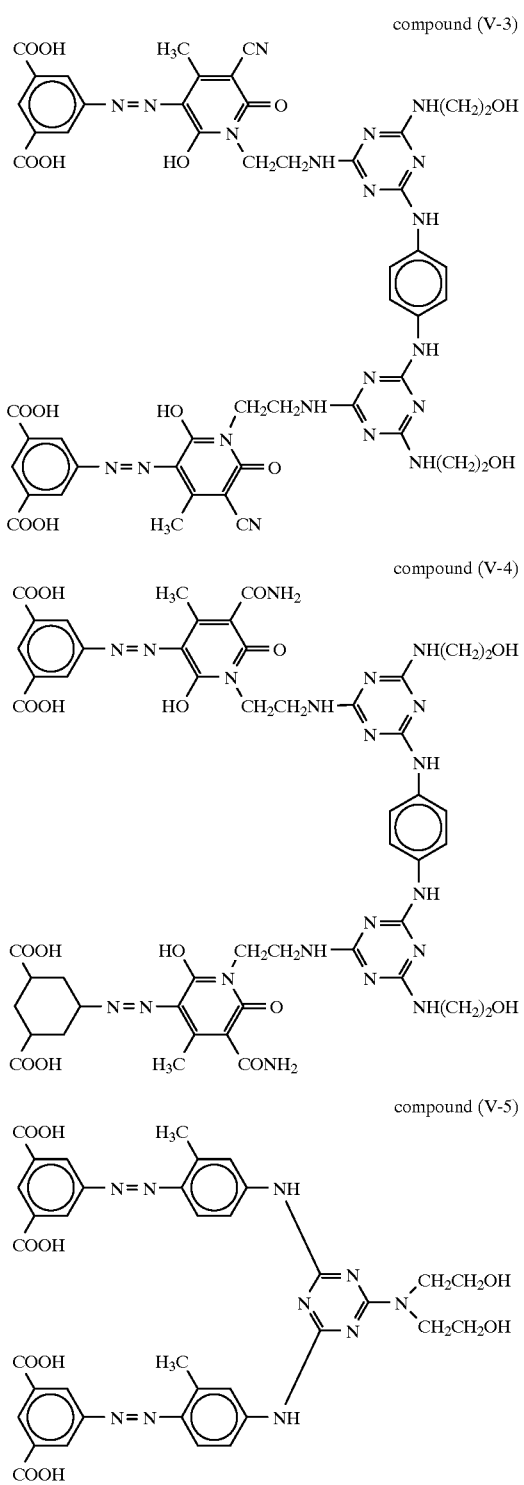
compound (V-3)
compound (V-4)
compound (V-5)
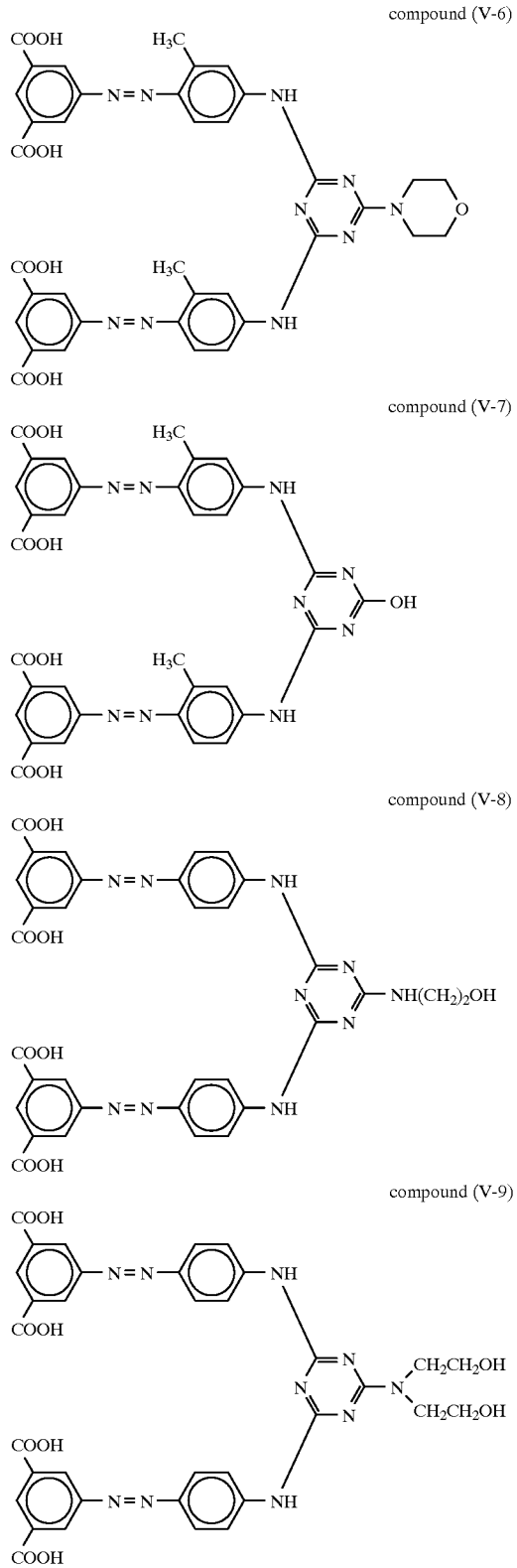
compound (V-6)
compound (V-7)
compound (V-8)
compound (V-9)

compound (V-10)
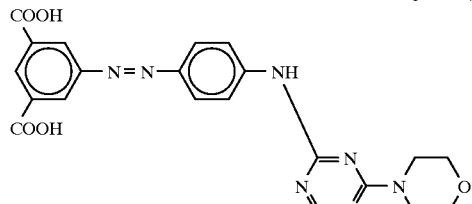
compound (V-11)
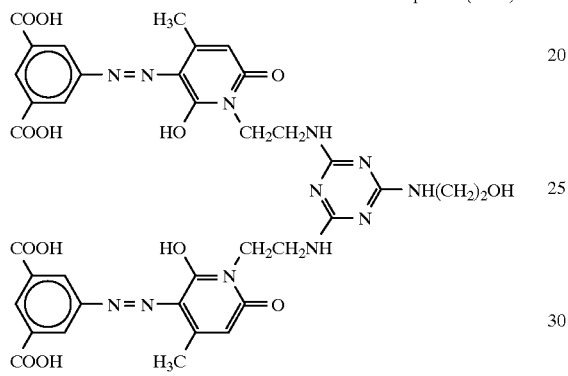
compound (V-12)
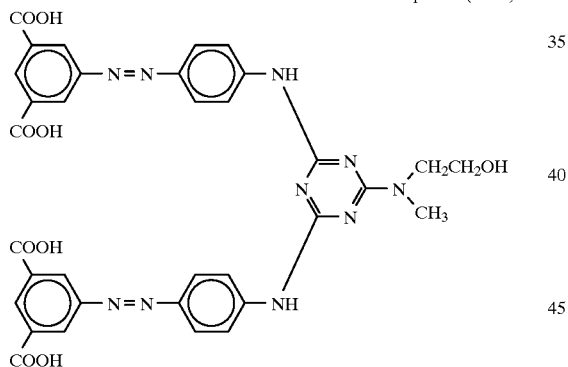
compound (V-13)
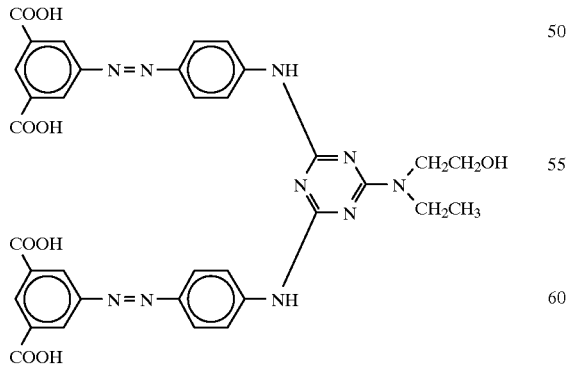
compound (V-14)
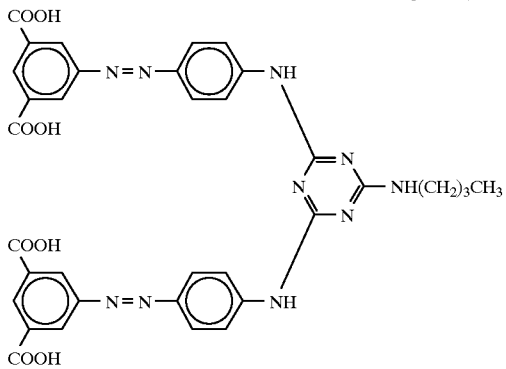

compound (V-15)
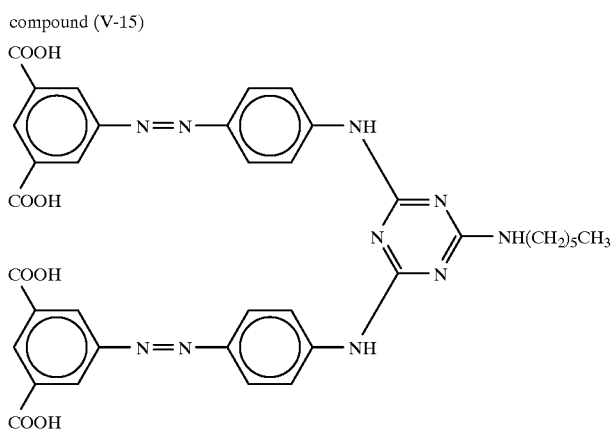
compound (V-16)
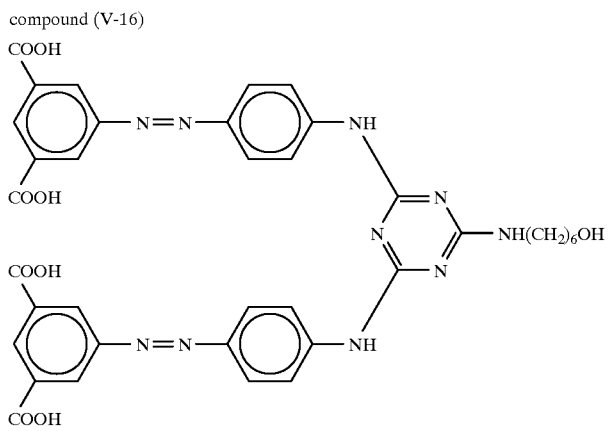
compound (V-17)
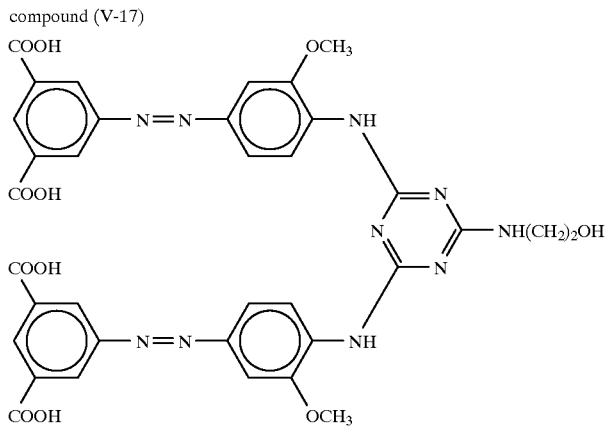

-continued
compound (V-18)
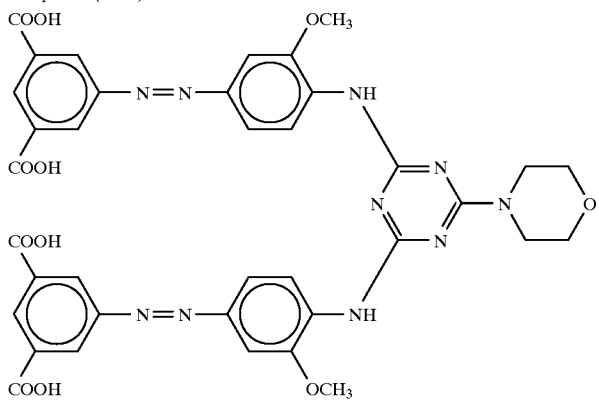
compound (V-17)
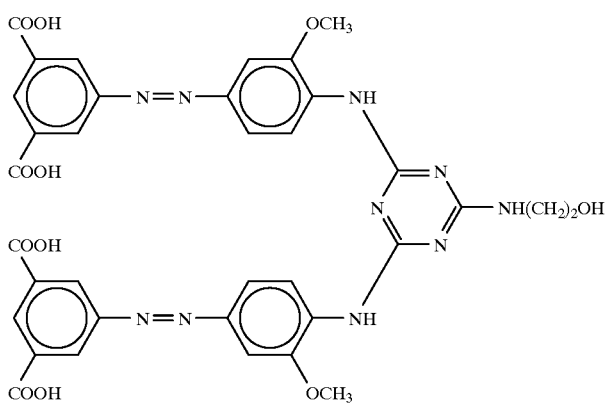
compound (V-18)
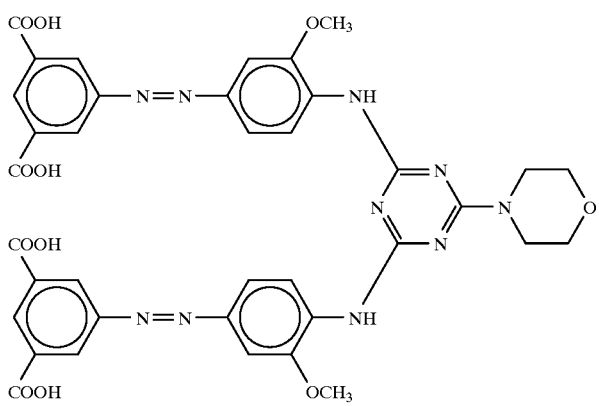
compound (V-19)
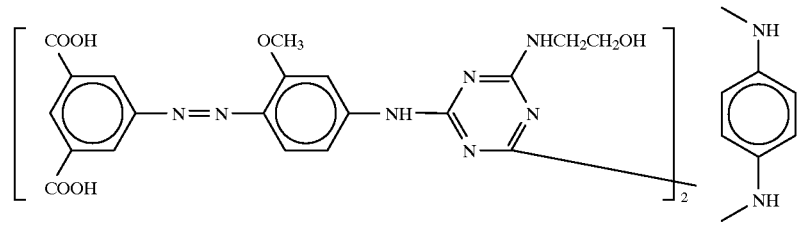

compound (V-20)
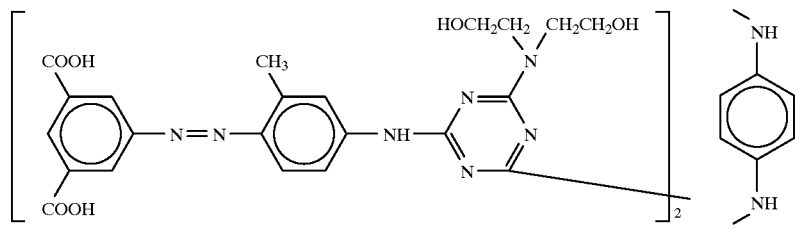
compound (V-21)
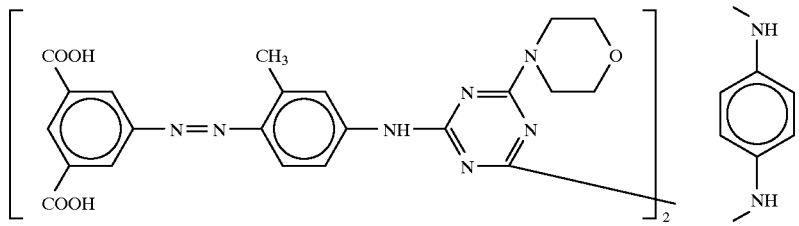
compound (V-22)
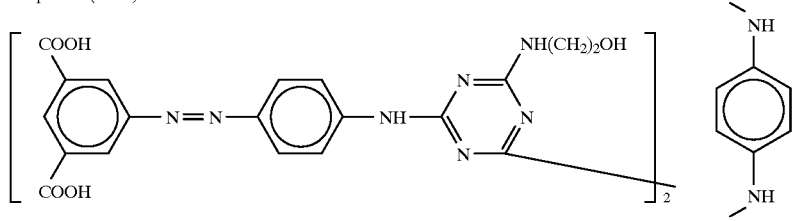
compound (V-23)
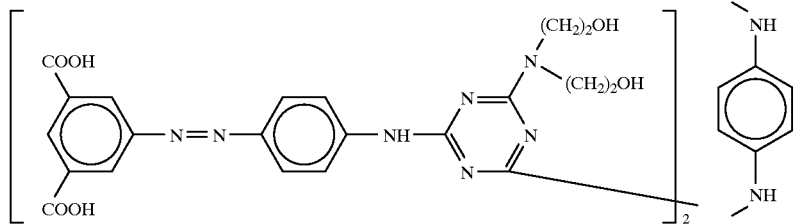
compound (V-24)
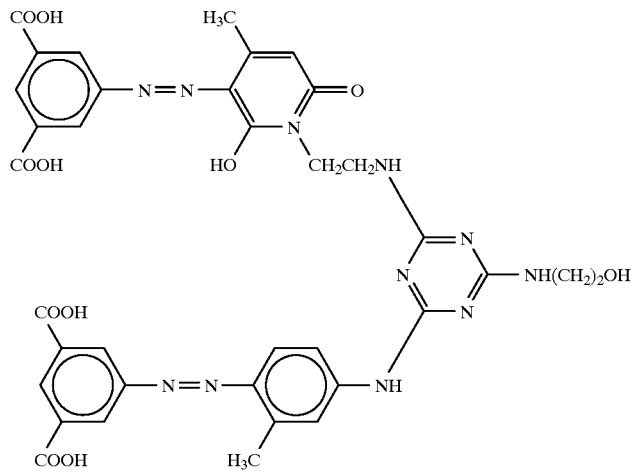
compound (V-22)

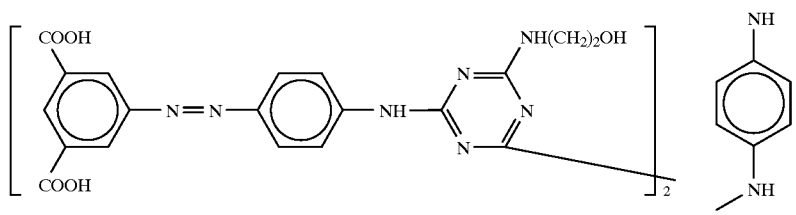
compound (V-23)
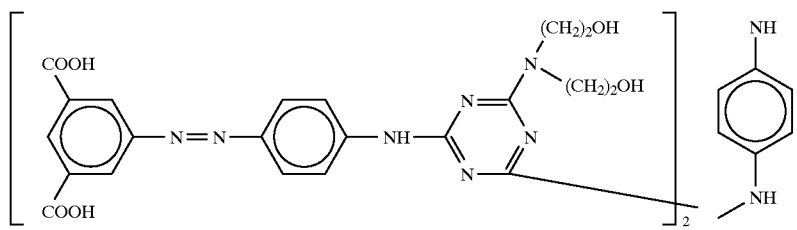
compound (V-24)
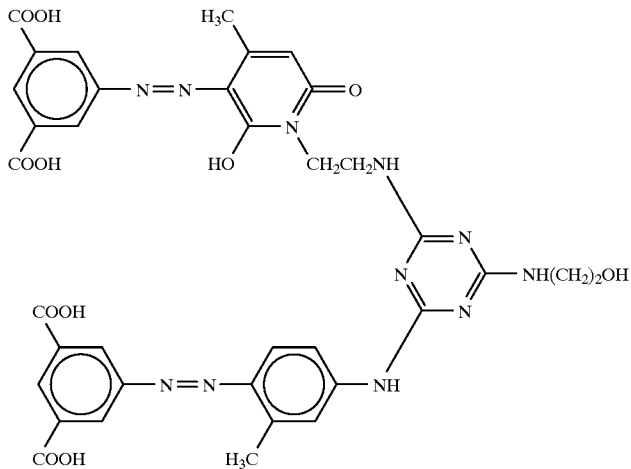
compound (V-25)
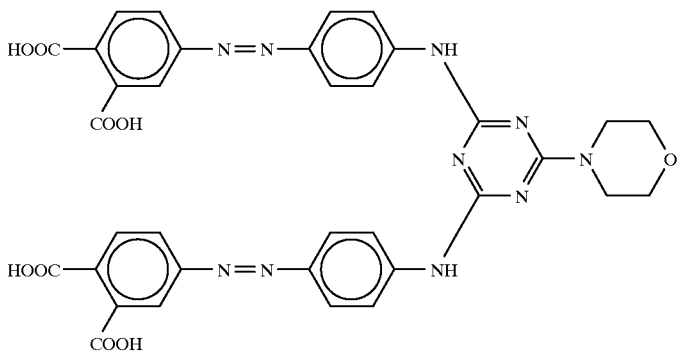

-continued
compound (V-26)
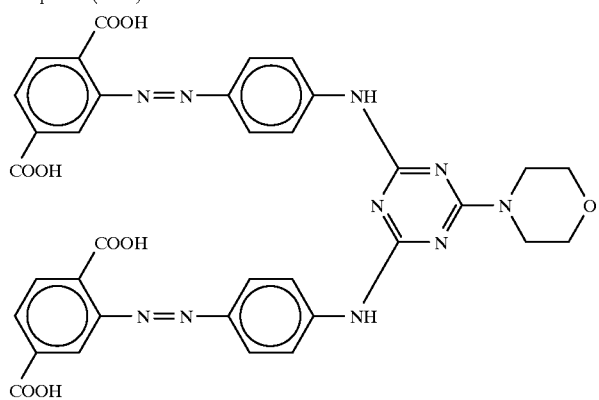
compound (V-27)
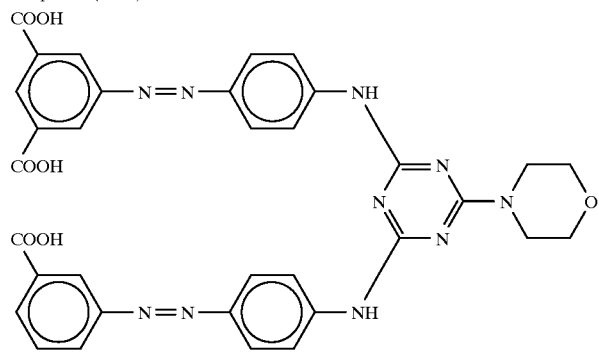
compound (V-28)
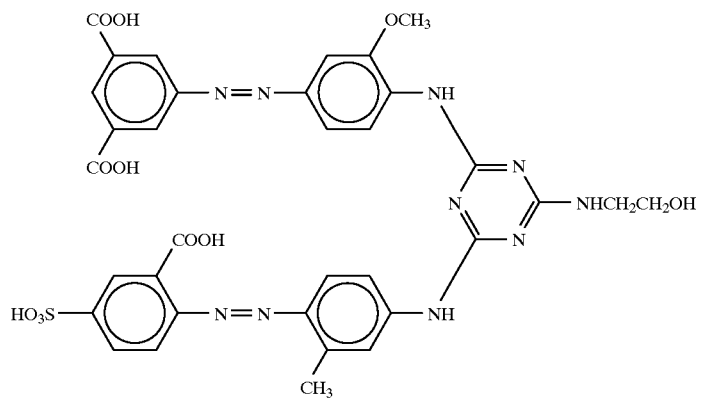
compound (V-27)
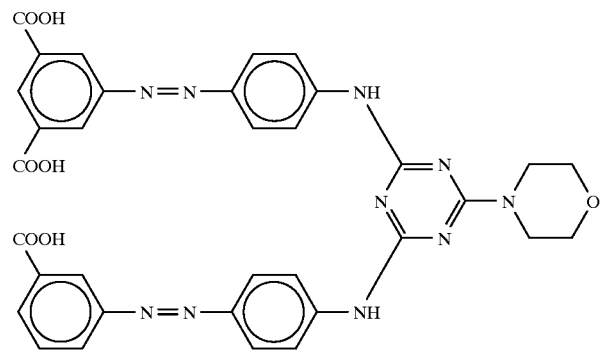
compound (V-28)

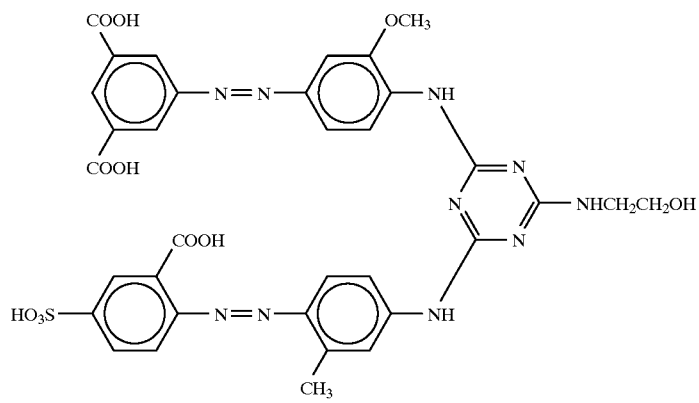
compound (V-29)
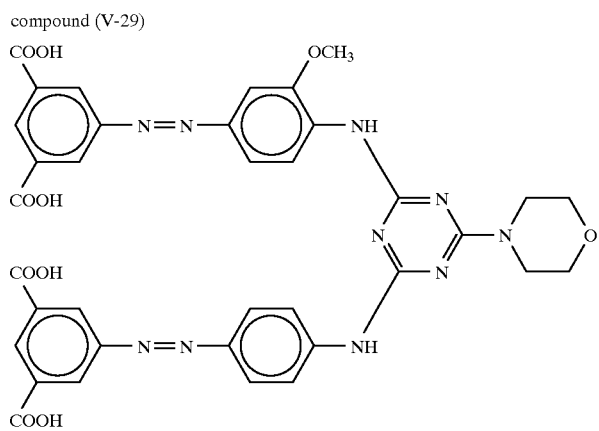
compound (V-30)
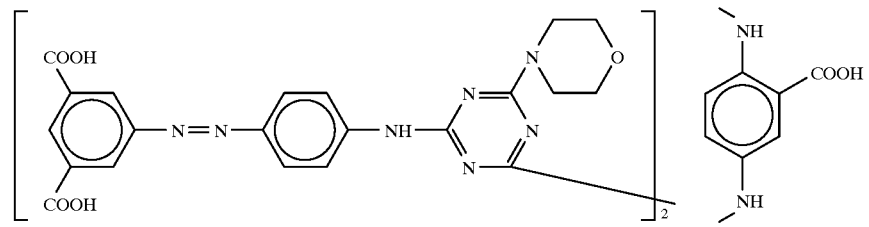
compound (VI-1)
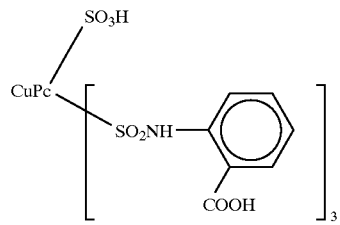
compound (VI-2)

-continued
compound (VI-3)
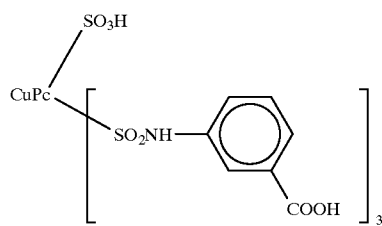
compound (VI-4)
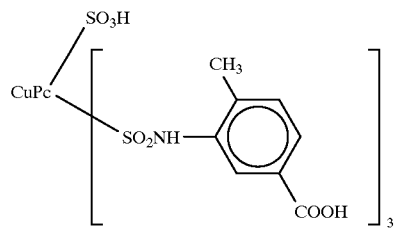
compound (VI-2)
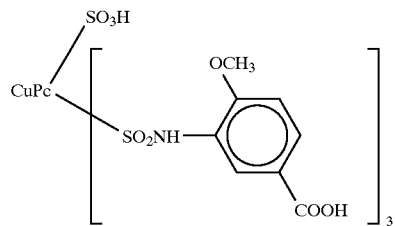
compound (VI-3)
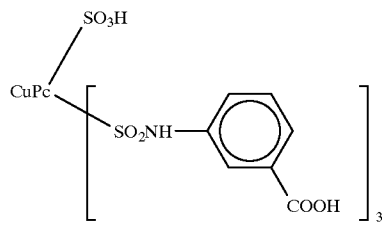
compound (VI-4)
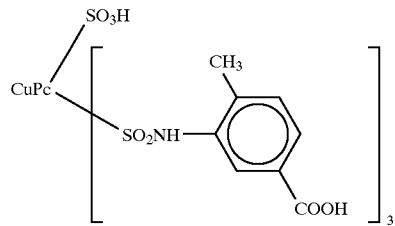
compound (VI-5)
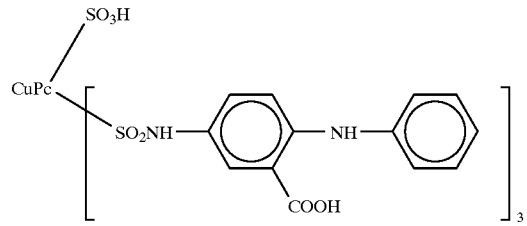

-continued
compound (VI-6)
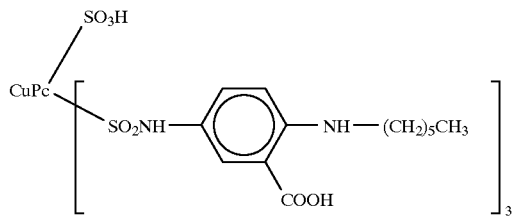
compound (VI-7)
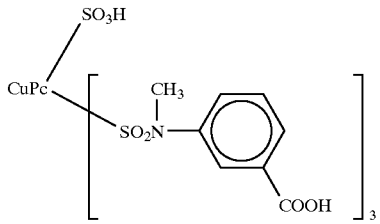
compound (VI-8)
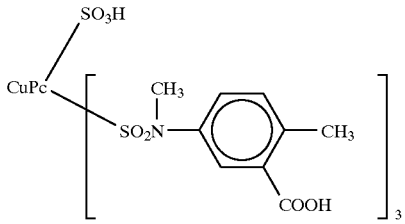
compound (VI-9)
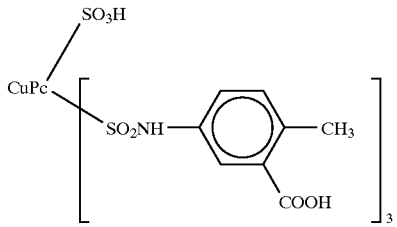
compound (VI-10)
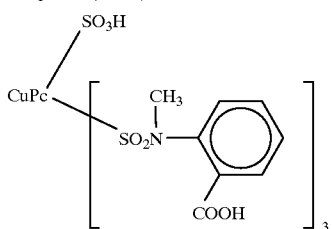
compound (VI-11)
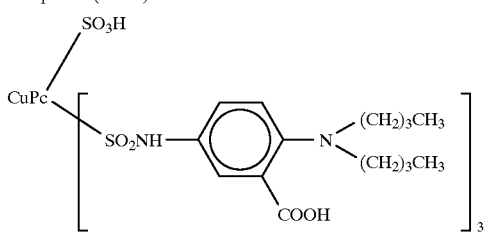

-continued
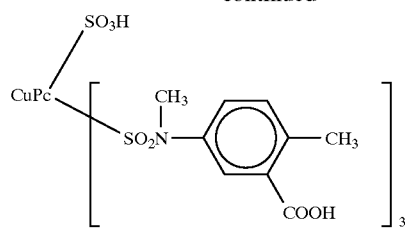
compound (VI-9)
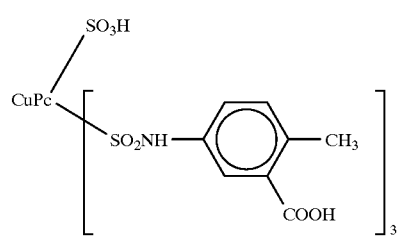
compound (VI-10)
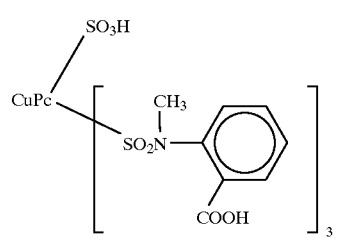
compound (VI-11)
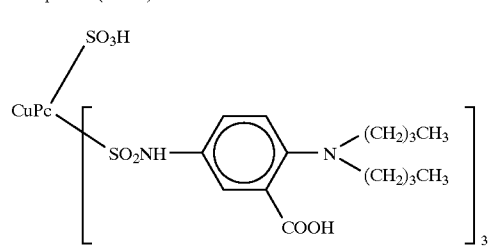
compound (VII-1)
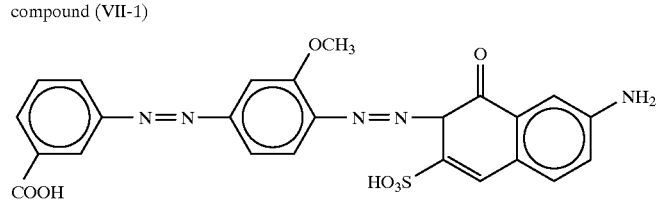
compound (VII-2)
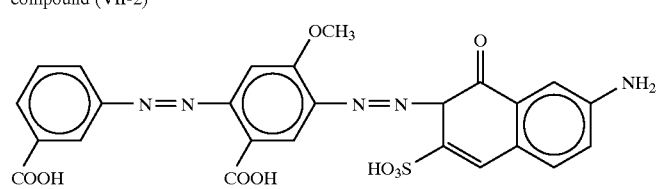
compound (VII-3)
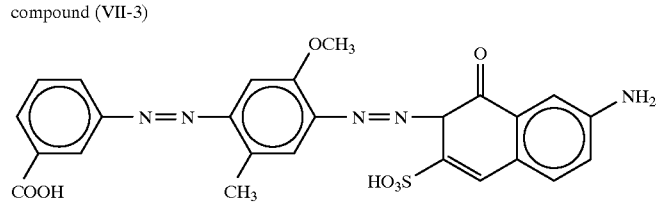

-continued compound (VII-4)

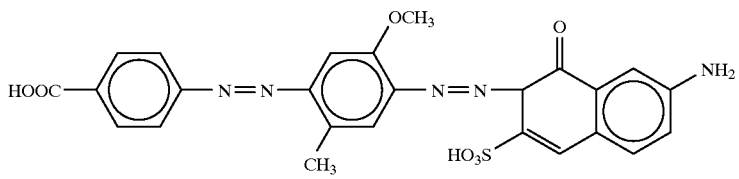

compound (VII-5)

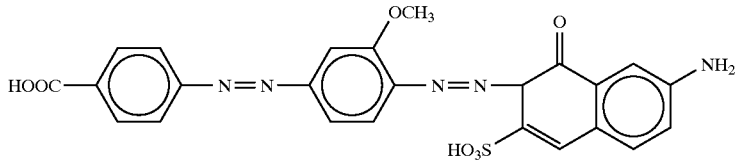

compound (VII-6)

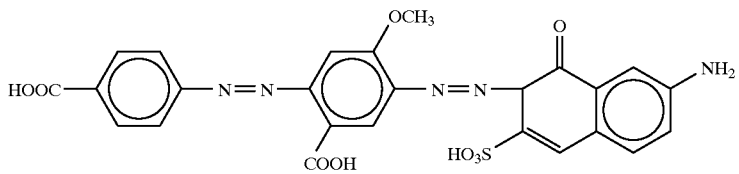

compound (VII-4)

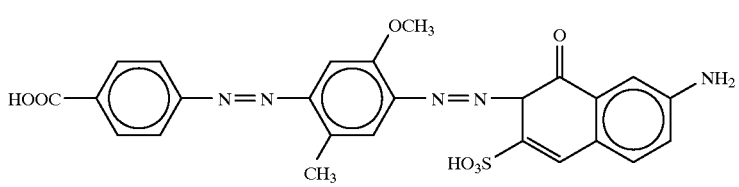

compound (VII-5)

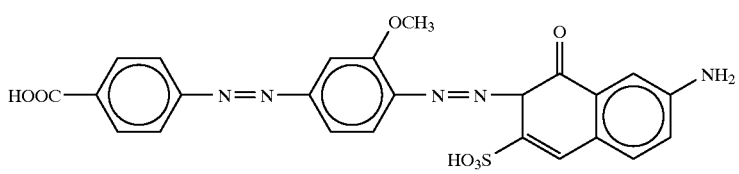

compound (VII-6)

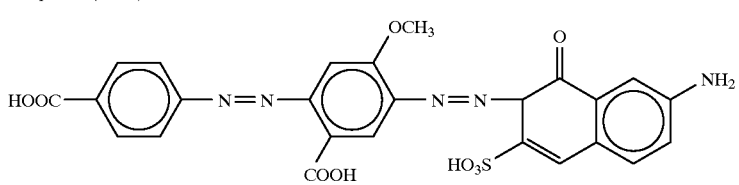

Though these dyes can be used alone, two or more of them may be mixed, and they may be colored custom color such as red, blue, green, and the like in addition to the four primary colors such as cyan, magenta, yellow, and black.

Also, an ink jet recording ink of the present invention can contain a dye having no carboxyl group in the form of a free acid.

The content of these dye is determined in accordance with color develop ability of the dye, and is preferably from 0.3 to 10% by weight based on the total amount of the ink. When the content of the dye is less than 0.3% by weight, image concentration is low, and when the content of the dye exceeds 10% by weight, the dye precipitates. It is more preferable that the content of the dye be 1 to 8% by weight from the viewpoint of solution stability.

The aqueous organic solvent used in the present invention includes, but is not limited to, polyhydric alcohols and polyglycols such as ethylene glycol, diethylene glycol, triethylene glycol, polyethylene glycol, propylene glycol, 1,5-pentanediol, glycerin, thiodiglycol and the like; glycol ethers such as ethylene glycol monomethyl ether, ethylene glycol monobutyl ether, diethylene glycol monoethyl ether, diethylene glycol monobutyl ether, triethylene glycol monobutyl ether, propylene glycol monomethyl ether and the like; pyrrolidone, N-methyl-2-pyrrolidone, triethanolamine, dimethylsulfoxide, sulfolane, and the like; and alcohols such as ethanol, isopropanol, butanol, benzylalcohol and the like; and alkanolamines such as monoethanolamine, diethanolamine, triethanilamine, and the like.

As the preferred aqueous organic solvent, polyhydric alcohols and polyglycols are preferable from the viewpoint of moisture retention and the solubility of dye and glycerine, ethylene glycol, diethylene glycol, propylene glycol, and thiodiglycol are particularly preferable. Alternatively, polyglycol ethers are preferable from the viewpoint of permeability of an ink into paper and the solubility of dye, and diethylene glycol monoethyl ether, diethylene glycol monobutyl ether, and triethylene glycol monobutyl ether are particularly preferable.

Though these water-soluble organic solvent can be used alone, two or more may be combined for use.

The ratio added of these aqueous organic solvent is preferably from 3 to 40% by weight based on the total amount of an ink. When the ratio added of the aqueous organic solvent is less than 3% by weight, the ink easily dries, when the ratio added of the aqueous organic solvent exceeds 40% by weight, fixing ability of the ink on paper is poor and the viscosity increases, making dischargeability worse.

As water used in the present invention, ion-exchanged water, ultrapure water, distilled water, and ultrafiltered water are preferably used to prevent the mixing in of impurities.

The amine compound used in the present invention is selected from the secondary or tertiary amine compound represented by general formula (I).

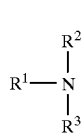

(I)

wherein one or two of $R^1$, $R^2$, and $R^3$ are an alkyl group having 1 to 5 carbon atoms in the alkyl chain and substituted by a substituent selected from a carboxyl group, a sulfonic group, an alkaline metal salt of a carboxyl group, and an alkaline metal salt of a sulfonic group; and the remainder is a group selected from a hydrogen atom, an alkyl group having 1 to 5 carbon atoms and a substituted alkyl group having 1 to 5 carbon atoms in the alkyl chain and substituted by a hydroxyl group or carbamoyl group. Further, two of $R^1$, $R^2$, and $R^3$ may be the same substituent.

In the above-described formula, examples of the alkyl group substituted by a carboxyl group include a carboxymethyl group, 1-carboxyethyl group, 2-carboxyethyl group, 1-carboxy-n-propyl group, 2-carboxy-n-propyl group, 3-carboxypropyl group, 2-carboxy-isopropyl group, 1-carboxyn-butyl group, 4-carboxybutyl group, 3-carboxyisobutyl group, 2-methyl-4-carboxybutyl group, carboxy-t-butyl group, 5-carboxypentyl group, and the like. Further, examples of the alkyl group substituted by a sulfonic group include alkyl groups in which the carboxyl group of the above-described carboxyl-substituted alkyl group is substituted by a sulfonic group, and the like. Analkyl group can have a substituent which is in the form of a lithium, sodium, potassium, or ammonium salt of these acidic groups. A carboxymethyl group, 1-carboxyethyl group, 1-carboxy-n-propyl group, sulfomethyl group, 1-sulfoethyl group, and 1-sulfo-n-propyl group are more preferable.

Examples of the alkyl group having 1 to 5 carbon atoms include a methyl group, ethyl group, propyl group, isopropyl group, butyl group, isobutyl group, t-butyl group, pentyl group, isopentyl group, t-pentyl group, neopentyl group, and the like.

Examples of the alkyl group substituted by a hydroxyl group include a methylol group, 2-hydroxyethyl group, methylolmethyl group, trimethylolmethyl group, 1-hydroxy-n-propyl group, 2-hydroxy-n-propyl group, 3-hydroxypropyl group, 2-hydroxyisopropyl group, 1-hydroxy-n-butyl group, 2-hydroxy-n-butyl group, 4-hydroxylbutyl group, 3-hydroxy-isobutyl group, 2-methyl-3-hydroxybutyl group, hydroxy-t-butyl group, 4-hydroxy-n-pentyl group, 5-hydroxypentyl group, and the like. Examples of the alkyl group substituted by a carbamoyl group include alkyl groups in which the carboxyl group of the above-described carboxyl-substituted alkyl group is substituted by a carbamoyl group. A methylol group, 2-hydroxyethyl group, trimethylolmethyl group, and carbamoylmethyl group are more preferable.

Representative examples of the amine compound include, but are not limited to, the above-described salts of acetamideglycine, N-2-hydroxyethylglycine, N-carbamoylmethyl-β-alanine, N-2-hydroxyethyl-N-carbamoylmethylglycine, N-hydroxymetyl-N-carbamoylmethyl-γ-amino butyric acid, N-carboxymethyliminoacetamide, N-carbamoylmethylimino diacetic acid, N-hydroxypropylimino dipropionic acid, N,N-bis (2-hydroxyethyl)glycine, and the like; and N-2-hydroxyethyl-2-amioethane sulfonic acid, N-3-hydroxypropyl-2-aminoethane sulfonic acid, Ncarbamoylmethyl-2-aminoethane sulfonic acid, N,N-bis (2-hydroxyethyl)-2-aminoethane sulfonic acid, N-2-hydroxyethyl-N-carbamoylmethylaminomethane sulfonic acid, N-2-hydroxyethyl-N-carbamoylmethyl-2-aminoethane sulfonic acid, N,N-bis-carbamoylmethyl-2-aminoethane sulfonic acid, N-2-hydroxyethyliminodiethane sulfonic acid, N-tris (hydroxyethyl)methyl-3-aminopropane sulfonic acid, N-tris (hydroxymethyl)methyl-3-aminopropane sulfonic acid, and the like.

Preferable amine compounds, N,N-bis (2-hydroxyethyl)-2-aminoethane sulfonic acid, acetamideglycine, N-carbamoylmethylimino diacetic acid, N-tris (hydroxymethyl)methyl-3-aminopropane sulfonic acid, and N,N-bis (2-hydroxyethyl)glycine are preferable from the viewpoint of solubility in an ink vehicle, and N,N-bis (2-hydroxyethyl) -2-aminoethane sulfonic acid is more preferable from the viewpoint of thermal stability.

When the alkyl chain bonded to the nitrogen atom of the amine compound represented by the above-described general formula has 6 or more carbon atoms, even if the amount added is small, viscosity of an ink increases remarkably, solubility in the ink is insufficient; consequently, there occur undesirable clogging and kogation. It is not preferable that the primary amine compound be used in the present invention because its chemical activity is too high and therefore easily corrodes and degrades the material of a recording head and tends to cause kogation. These amine compounds may be used alone or in combinations of two or more.

The ratio added of the amine compound is regulated to a suitable amount depending on the solubility of the dye itself, and preferably from 0.1 to 8% by weight. When the ratio added of the amine compound is less than 0.1% by weight, solution stability of dye is easily lost, and pH of the solution is unstable. On the other hand, when the ratio added of the amine compound exceeds 8% by weight, the amine compound crystallizes and aggregates easily. The ratio added of the amine compound is more preferably from 0.4 to 3% by weight because of its good balance between the solution stability of the dye and the solution stability of the amine compound.

Examples of the alkali metal hydroxide used in the present invention include, but are not limited to, lithium hydroxide, sodium hydroxide, potassium hydroxide, and the like.

As the preferable alkali metal hydroxide, lithium hydroxide and sodium hydroxide are preferable because of the good water retention when ionized.

The ratio of the alkali metal hydroxide added is determined in accordance with the amount of the amine compound added, and preferably 0.05% or more by weight to maintain pH of 8.5 or more. This ratio added is preferably 5% or less by weight to sufficiently restrain degradation such as corrosion, dissolution, releasing, and the like of material constantly in contact with an ink in an ink jet recording apparatus including a head material, and the alkali metal hydroxide is preferably added in this range so that the pH of ink is from 8.5 to 12.

When the pH of ink exceeds 12, degradations such as corrosion, dissolution, releasing, and the like of the material which is constantly in contact with an ink in an ink jet recording apparatus, including a head material, develop easily, and when the pH of ink is less than 8.5, the micelle dissolving condition of the dye having a carboxyl group changes, the dye rapidly precipitates and the viscosity increases when water evaporation occurs on the surface of the nozzle, consequently clogging easily occur. The ink more preferably have pH from 8.5 to 10.

In the present invention, an ink may contain an aqueous organic compound which is solid at normal temperature and 50% or less by weight thereof evaporates at a temperature from 100 to 350° C. Examples of such an aqueous organic compound include an organic acid ester, organic acid amide, organic acid ammonium salt, thioester, thioamide, carbonic acid ester, carbonic acid amide, phosphoric acid ester, phosphoric acid amide, betaine and the like which have a molecular weight of less than 200. The above-described normal temperature means a temperature around 25° C. The phrase "50% or more by weight thereof evaporates at a temperature range from 100 to 350° C. means that when thermogravimetric analysis is conducted and temperature increases at a speed of 20° C./minute, the weight reduction ratio represented by the weight of solid at from 100 to 350° C. over that at normal temperature is 50% or more. In the present invention, the vaporization ratio of these compounds must be 50% or more by weight. When the ratio of vaporization of these compounds is high, the image-improvement effect is high, and, when the ink jet recording method which forms ink droplets by heating the ink is used, kogation is reduced. Therefore, it is preferably that the ratio be 65% or more by weight. In addition, when safety is taken into consideration, urea, thiourea, and derivatives thereof are particularly preferable as the aqueous organic compound.

Further, by adding urea, thiourea, or a derivative thereof to an ink of the present invention, water evaporation can be suppressed, and the solution stability of a dye can be further enhanced, and nozzle clogging can be further suppressed. In addition, when combined with the amine compound described in the present specification, a sharp printed image can be obtained which causes no dot blotting even on ordinary paper. This is believed to be derived from the development of a thixotropic property in an ink drying.

Examples of the derivatives of urea and thiourea include, but are not limited to, monoalkyl ureas such as methyl urea, ethyl urea, and the like; dialkyl ureas such as dimethyl urea, diethyl urea, and the like; ethylene urea; monoalkylthio ureas such as methylthiourea, ethylthiourea and the like; dialkylthioureas such as dimethylthio, urea, diethylthio urea and the like; and ethylenethio urea and the like.

From the viewpoint of the moisture retention of an ink, urea and thio urea are preferred, and from the viewpoint of stability over time and solution stability, ethylene urea is preferred.

The ratio added of the aqueous organic compound is preferably 1% or more by weight to sufficiently retain moisture retention and the mutual action of an amine compound and alkali metal hydroxide and to obtain an image having no blotting, and is preferably 15% or less by weight to obtain sufficient solution stability of the aqueous organic compound and sufficient clogging resistance. Further, the ratio from 3 to 9% by weight is more preferable.

An ink of the present invention may contain a surfactant to further stabilize the condition of the dye solution. As the surfactant, any of nonionic, anionic, cationic, and ampholytic surfactants may be used.

Examples of the nonionic surfactant include polyoxyethylenealkylphenyl ethers such as polyoxyethylenenonylphenyl ether, polyoxyethyleneoctylphenyl ether, polyoxyethylenedodecylphenyl ether, and the like; and polyoxyethylenealkyl ether, polyoxyethylene fatty ester, sorbitan fatty ester, polyoxyethylene-polyoxypropylene block copolymer, ethylene oxide adducts of acetylene glycol, ethylene oxide adduct of glycerin, polyoxyethylenesorbitan fatty ester, fatty alkylolamide, and the like. Examples of the anionic surfactant include alkylbenzene sulfonate salt, alkylnaphthalene sulfonate salt, formalin condensate of alkylnaphthalene sulfonate salt, higher fatty acid salt, sulfate salt of higher fatty acid ester, sulfonate salt of higher fatty acid ester, sulfate ester salt and sulfonate salt of higher alcohol ether, alkylcarbonate salt of higher alkyl sulfonamine, sulfosuccinate salt, ester salt thereof, and the like. Examples of the cationic surfactant include primary, secondary and tertiary amine salts, quaternary ammonium salt and the like, and examples of the ampholytic surfactant include betaine, sulfobetaine, sulfatebetaine, imidazolylbetaine, and the like.

Further, fluorine-contained surfactants such as polyoxyethyleneperfluoroaklyl ether, perfluoroaklylbenzene sulfonate salt, perfluoroalkyl quaternary ammonium salt, and silicon-contained surfactants may be added to an ink of the present invention.

Among these surfactants, nonionic surfactants which do not easily cause mutual action with a dye ion and additive ion are preferred, and polyoxyethylenealkyl ether, polyoxyethylenealkylphenyl ether, and polyoxyethylene/polyoxypropylene block copolymer, are preferred from the viewpoint of thermal stability and purity.

The ratio added of the surfactant is preferably from 0.005 to 5% by weight, and more preferably from 0.01 to 2% by weight.

In addition, as an inclusion compound, cyclodextrin, polycyclodextrin, macrocyclic amines, crown ethers, acetamide, and the like, and, as a chelating agent, EDTA (ethylenediamine-N,N,N',N'-tetraacetic acid), EDMA (ethylenediamine-N-monoacetic acid), NTA (nitrilotriacetic acid), and the like may be added to an ink of the present invention.

Also, an ink of the present invention can comprise anti-fungal agents such as benzoic acid, sodium benzoate, salicylic acid, dehydroacetic acid, sodium dehydroacetate, propionic acid, sodium propionate and the like, and water-soluble polymers such as sodium alginate, styrene-acrylic acid copolymer, polyvinyl alcohol, polyvinyl pyrrolidone, and the like.

The above-described inks can be used in the ink jet recording method in which an image is recorded by discharging ink droplets from an orifice based on recording signals. As an ink jet recording method, a so-called charge-control method in which an ink is discharged using electrostatic-attraction force, a so-called drop-on-demand method (pressure pulse method) in which an ink is discharged using vibration pressure of a piezoelectric element, and a so-called thermal ink jet method in which an ink is discharged using pressure generated by forming and growing bubbles by heating ink, and the like.

Figure 1B:
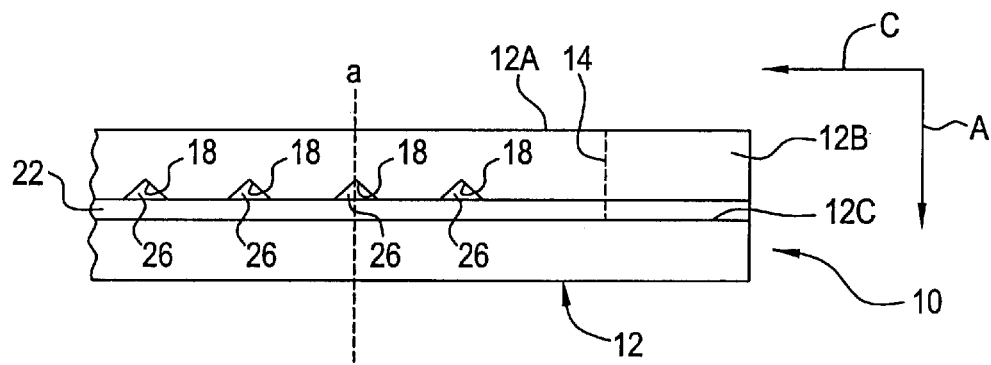
FIG. 1B is a front view of the above-described recording head.
Figure 1C:
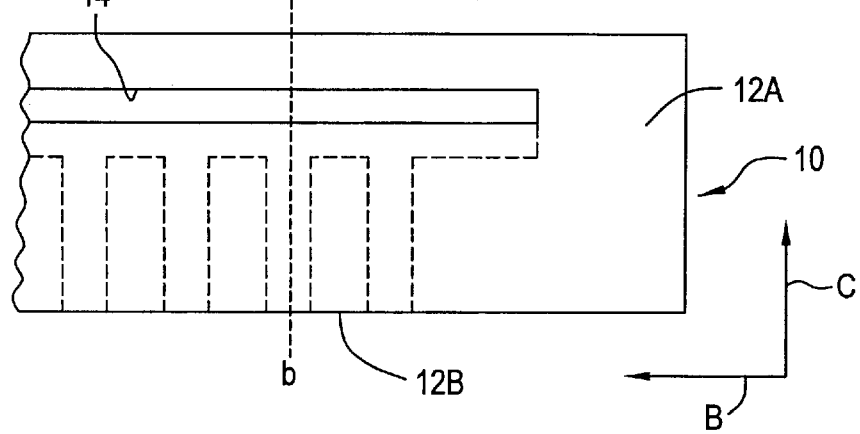
FIG. 1C is a plane view of the above-described recording head.

In FIG. 1, one example of a recording head used in a thermal inkjet recording method is shown, and FIG. 1(B) is a front view, FIG. 1(C) is a plane view, FIG. 1(A) is a sectional view along the dotted line ab in FIG. 1(B) and (C). In FIG. 1, arrow A indicates direction of height, arrow B indicates direction of depth, and arrow C indicates direction of length.

A recording head 10 has a rectangular parallelopiped main body 12 made of silicon. This main body 12 has a first flow route 14 formed which is parallel to the direction of height (the direction indicated by arrow A), and reaching from an upper surface 12A to substantially the midportion in the direction of the height of the main body 12.

The main body 12 has a rectangular parallelopiped cutout 12C formed which is parallel to the direction of depth (the direction indicated by arrow B), and reaching from a front surface 12B to just before the first flow route 14, and a communication route 16 formed which is parallel to the direction of depth (the direction indicated by arrow B), and communicates the cutout 12C and the first flow route 14.

Further, the main body 12 has a second flow route 18 which is parallel to the direction of depth (the direction indicated by arrow B) at a position which leads to the cutout 12C. The front shape of this second flow route 18 is triangle, and the length in the direction of depth of the second flow route 18 is slightly longer than the length in the direction of depth of the cutout 12C.

The main body 12 has a communication route 20 formed which is parallel to the direction of height (the direction indicated by arrow A), and communicates the front surface side of the communication route 16 and the side opposite to the front surface side of the second flow route 18.

Further, into the cutout 12C is inserted a rectangular parallelopiped insertion member 22 made of a polyimide resin, and fixed with an epoxy resin. In this insertion member 22, a rectangular parallelopiped cutout 22A is formed at a substantially midway portion in the direction of the depth of the insertion member 22 under the second flow route 18, and in the cutout 22A, a heat generation body 24 as heating means is placed which is connected to a controller (not shown).

In this recording head 10, the first flow route 14, communication routes 16, 20, and the second flow route 18 form an ink flow route, and the front surface side of the second flow route 18 is a discharge port 26 thereof. The ink flowing along the ink flow route is heated by a heat generation body 24 placed under the second flow route 18, and consequently droplets are formed and discharged from the discharge port 26.

The heating of the heat generation body 24 can be conducted by applying a plural of pulses to a controller (not shown) based on recording signals.

Further, ink droplets may be predischarged to prevent clogging when recording is not conducted.

EXAMPLES

The following examples and comparative examples further illustrate the present invention in detail:

Example 1

| | |
|---|---|
| ammonium salt of compound (II-1) dye | 3 parts by weight |
| glycerin | 10 parts by weight |
| $(HOC_2H_4)_2NC_2H_4SO_3H$ | 2.5 parts by weight |
| sodium hydroxide | 0.5 parts by weight |
| urea (vaporization rate: 70% by weight) | 8 parts by weight |
| polyoxyethylenelauryl ether (15 mol EO adduct) | 0.1 part by weight |
| ion-exchanged water | 75.9 parts by weight |
| | (Total: 100 parts by weight) |

The above-described components were mixed sufficiently, then filtered under pressure using a 0.45 μm filter to prepare an ink. The prepared ink had a pH of 9.1.

Example 2

| | |
|---|---|
| ammonium salt of compound (II-2) dye | 2 parts by weight |
| glycerin | 8 parts by weight |
| diethylene glycol | 5 parts by weight |
| $(HOC_2H_4)_2NCH_2COOH$ | 1.5 parts by weight |
| sodium hydroxide | 0.25 parts by weight |
| urea (vaporization rate: 70% by weight) | 5 parts by weight |
| polyoxyethylenenonyl ether (18 mol EO adduct) | 0.1 part by weight |
| ion-exchanged water | 78.15 parts by weight |
| | (Total: 100 parts by weight) |

The above-described components were mixed sufficiently, then filtered under pressure using a 0.45 μm filter to prepare an ink. The prepared ink had a pH of 9.4.

Example 3

| | |
|---|---|
| ammonium salt of compound (II-3) dye | 2 parts by weight |
| glycerin | 5 parts by weight |
| 2-pyrrolidone | 5 parts by weight |
| $(H_2NCOCH_2)NHCH_2COOH$ | 2 parts by weight |
| sodium hydroxide | 0.35 parts by weight |
| ethylurea (vaporization rate: 85% by weight) | 3 parts by weight |
| nonionic surfactant (Tradename: Surfinol 465 manufactured by Nisshin Kagaku K.K.) | 0.1 part by weight |
| ion-exchanged water | 82.55 parts by weight |
| | (Total: 100 parts by weight) |

The above-described components were mixed sufficiently, then filtered under pressure using a 0.45 μm filter to prepare an ink. The prepared ink had a pH of 8.8.

Example 4

| | |
|---|---|
| ammonium salt of compound (III-2) dye | 3.5 parts by weight |
| diethylene glycol | 10 parts by weight |
| 2-(2-butoxyethoxy)ethanol | 5 parts by weight |

-continued

| | |
|---|---|
| $(HOCH_2)_3CNH(CH_2)_2SO_3H$ | 4.5 parts by weight |
| sodium hydroxide | 0.30 parts by weight |
| urea (vaporization rate: 70% by weight) | 3 parts by weight |
| nonionic surfactant (Tradename: Pluronic PE4300 manufactured by BASF) | 0.1 part by weight |
| ion-exchanged water | 73.6 parts by weight |
| (Total: 100 parts by weight) | |

The above-described components were mixed sufficiently, then filtered under pressure using a 0.45 μm filter to prepare an ink. The prepared ink had a pH of 8.7.

Example 5

| | |
|---|---|
| ammonium salt of compound (IV-1) dye | 2.5 parts by weight |
| glycerin | 10 parts by weight |
| $(HOCH_2)_3CNH(CH_2)_3SO_3H$ | 4.5 parts by weight |
| sodium hydroxide | 0.1 parts by weight |
| dimethylurea (vaporization rate: 99% by weight) | 4.5 parts by weight |
| nonionic surfactant (Tradename: Surfinol 465 manufactured by Nisshin Kagaku K.K.) | 2.5 part by weight |
| ion-exchanged water | 75.9 parts by weight |
| (Total: 100 parts by weight) | |

The above-described components were mixed sufficiently, then filtered under pressure using a 0.45 μm filter to prepare an ink. The prepared ink had a pH of 9.2.

Example 6

| | |
|---|---|
| ammonium salt of compound (V-1) dye | 2.5 parts by weight |
| glycerin | 7 parts by weight |
| ethylene glycol | 9 parts by weight |
| $(HOCH_2)_3CNH(CH_2)_3SO_3H$ | 1 part by weight |
| sodium hydroxide | 0.17 part by weight |
| thiourea (vaporization rate: 75% by weight) | 7 parts by weight |
| nonionic surfactant (Tradename: Surfinol 465 manufactured by Nisshin Kagaku K.K.) | 2.5 parts by weight |
| ion-exchanged water | 70.83 parts by weight |
| (Total: 100 parts by weight) | |

The above-described components were mixed sufficiently, then filtered under pressure using a 0.45 μm filter to prepare an ink. The prepared ink had a pH of 10.3.

Example 7

| | |
|---|---|
| ammonium salt of compound (II-1) dye | 2 parts by weight |
| glycerin | 10 parts by weight |
| isopropanol | 3 parts by weight |
| $(HOCH_2)_3CNH(CH_2)_3SO_3H$ | 3.0 parts by weight |

-continued

| | |
|---|---|
| sodium hydroxide | 0.35 parts by weight |
| urea (vaporization rate: 70% by weight) | 5 parts by weight |
| polyoxyethylenelauryl ether (15 mol EO adduct) | 0.1 part by weight |
| ion-exchanged water | 76.05 parts by weight |
| (Total: 99.5 parts by weight) | |

The above-described components were mixed sufficiently, then filtered under pressure using a 0.45 μm filter to prepare an ink. The prepared ink had a pH of 8.8.

Example 8

| | |
|---|---|
| ammonium salt of compound (II-1) dye | 2 parts by weight |
| glycerin | 10 parts by weight |
| thiodiglycol | 3 parts by weight |
| $H_2NCOCH_2N(CH_2COOH)_2$ | 4.5 parts by weight |
| sodium hydroxide | 2.6 parts by weight |
| urea (vaporization rate: 70% by weight) | 3 parts by weight |
| polyoxyethylenelauryl ether (15 mol EO adduct) | 0.2 parts by weight |
| ion-exchanged water | 74.7 parts by weight |
| (Total: 100 parts by weight) | |

The above-described components were mixed sufficiently, then filtered under pressure using a 0.45 μm filter to prepare an ink. The prepared ink had a pH of 11.5.

Example 9

| | |
|---|---|
| ammonium salt of compound (VI-2) dye | 3.5 parts by weight |
| diethylene glycol | 15 parts by weight |
| 2-(2-butoxyethoxy)ethanol | 7 parts by weight |
| $(HOCH_2)_3CNH(CH_2)_2SO_3H$ | 2.5 parts by weight |
| sodium hydroxide | 0.65 parts by weight |
| ethyleneurea (vaporization rate: 98% by weight) | 3 parts by weight |
| nonionic surfactant (Tradename: Pluronic PE4300 manufactured by BASF) | 0.1 part by weight |
| ion-exchanged water | 66.25 parts by weight |
| (Total: 98 parts by weight) | |

The above-described components were mixed sufficiently, then filtered under pressure using a 0.45 μm filter to prepare an ink. The prepared ink had a pH of 9.1.

Example 10

An ink was prepared in the same manner as in Example 1 except that 0.3 parts by weight of lithium hydroxide was added instead of the sodium hydroxide in Example 1. The prepared ink had a pH of 9.0.

Example 11

An ink was prepared in the same manner as in Example 1 except that 0.7 parts by weight of potassium hydroxide was added instead of the sodium hydroxide in Example 1. The prepared ink had a pH of 9.2.

Example 12

An ink was prepared in the same manner as in Example 4 except that 0.2 parts by weight of lithium hydroxide was added instead of the sodium hydroxide in Example 4. The prepared ink had a pH of 8.9.

Example 13

An ink was prepared in the same manner as in Example 4 except that 0.7 parts by weight of potassium hydroxide was added instead of the sodium hydroxide in Example 4. The prepared ink had a pH of 9.6.

Examples 14 to 16

Inks were prepared in the same manner as in Examples 2, 7, and 8 except that urea was not added, the lack being supplemented with an ion-exchanged water. The prepared inks had a pH of 9.4, 8.7, and 11.5.

Example 17

An ink was prepared in the same manner as in Example 3 except that Surfinol 465 in Example 3 was not added. The prepared ink had a pH of 8.7.

Example 18

An ink was prepared in the same manner as in Example 4 except that Pluronic PE4300 in Example 4 was not added. The prepared ink had a pH of 8.8.

Examples 19 to 22

Inks were prepared in the same manner as in Examples 1, 4, 5, and 9 except that the ammonium salts of dyes in Examples 1, 4, 5, and 9 were substituted by sodium salts. The prepared inks had pH of 9.5, 8.7, 9.9, and 9.3.

Comparative Example 1

| | |
|---|---|
| ammonium salt of compound (II-1) dye | 3 parts by weight |
| glycerin | 10 parts by weight |
| 25% by weight ammonia water | 0.1 part by weight |
| urea (vaporization rate: 70% by weight) | 8 parts by weight |
| polyoxyethylenelauryl ether (15 mol EO adduct) | 0.1 part by weight |
| ion-exchanged water | 78.8 parts by weight |
| (Total: 100 parts by weight) | |

The above-described components were mixed sufficiently, then filtered under pressure using a 0.45 μm filter to prepare an ink. The prepared ink had a pH of 9.0.

Comparative Example 2

| | |
|---|---|
| ammonium salt of compound (II-1) dye | 3 parts by weight |
| glycerin | 10 parts by weight |
| potassium dihydrogen phosphate | 0.1 part by weight |
| sodium dihydrogen phosphate | 0.1 part by weight |
| urea (vaporization rate: 70% by weight) | 8 parts by weight |
| polyoxyethylenelauryl ether (15 mol EO adduct) | 0.1 part by weight |
| ion-exchanged water | 78.7 parts by weight |
| (Total: 100 parts by weight) | |

The above-described components were mixed sufficiently, then filtered under pressure using a 0.45 μm filter to prepare an ink. The prepared ink had a pH of 7.4.

Comparative Example 3

| | |
|---|---|
| ammonium salt of compound (II-1) dye | 3 parts by weight |
| glycerin | 10 parts by weight |
| sodium hydoxide | 0.5 parts by weight |
| urea (vaporization rate: 70% by weight) | 8 parts by weight |
| polyoxyethylenelauryl ether (15 mol EO adduct) | 0.1 part by weight |
| ion-exchanged water | 78.4 parts by weight |
| (Total: 100 parts by weight) | |

The above-described components were mixed sufficiently, then filtered under pressure using a 0.45 μm filter to prepare an ink. The prepared ink had a pH of 10.5.

Comparative Example 4

| | |
|---|---|
| ammonium salt of compound (VI-2) dye | 2 parts by weight |
| diethylene glycol | 15 parts by weight |
| 2-(2-butoxyethoxy)ethanol | 7 parts by weight |
| lithium hydroxide | 0.08 parts by weight |
| nonionic surfactant (Tradename: Pluronic PE4300 manufactured by BASF) | 0.1 part by weight |
| ion-exchanged water | 75.82 parts by weight |
| (Total: 100 parts by weight) | |

The above-described components were mixed sufficiently, then filtered under pressure using a 0.45 μm filter to prepare an ink. The prepared ink had a pH of 9.1.

Comparative Example 5

| | |
|---|---|
| ammonium salt of compound (II-1) dye | 2 parts by weight |
| glycerin | 10 parts by weight |
| thiodiglycol | 3 parts by weight |
| sodium hydroxide | 0.13 part by weight |
| ion-exchanged water | 84.87 parts by weight |
| (Total: 100 parts by weight) | |

The above-described components were mixed sufficiently, then filtered under pressure using a 0.45 μm filter to prepare an ink. The prepared ink had a pH of 9.3.

Comparative Example 6

| | |
|---|---|
| ammonium salt of compound (IV-1) dye | 2.5 parts by weight |
| glycerin | 10 parts by weight |
| sodium hydroxide | 0.1 part by weight |
| dimethylurea (vaporization rate: 99% by weight) | 4.5 parts by weight |
| nonionic surfactant (Tradename: Surfinol 465 manufactured by Nisshin Kagaku K.K.) | 2.5 part by weight |
| ion-exchanged water | 89.4 parts by weight |
| (Total: 109 parts by weight) | |

The above-described components were mixed sufficiently, then filtered under pressure using a 0.45 μm filter to prepare an ink. The prepared ink had a pH of 9.4.

Comparative Example 7

An ink was prepared in the same manner as in Example 1 except that the dye in Example 1 was changed to Food Black 2. The prepared ink had a pH of 9.2.

Comparative Example 8

An ink was prepared in the same manner as in Example 4 except that the dye in Example 4 was changed to Acid Blue 9. The prepared ink had a pH of 8.6.

Comparative Example 9

An ink was prepared in the same manner as in Example 5 except that the dye in Example 5 was changed to Acid Red 52. The prepared ink had a pH of 8.9.

Comparative Example 10

An ink was prepared in the same manner as in Example 1 except that the amount added of sodium hydroxide in Example 1 was changed to 0.1 part by weight. The prepared ink had a pH of 6.8.

Comparative Example 11

An ink was prepared in the same manner as in Example 8 except that 5 parts by weight of potassium hydroxide was added instead of the sodium hydroxide in Example 8, and ion-exchanged water was reduced in the amount corresponding to the increased amount. The prepared ink had a pH of 13.8.

Comparative Example 12

An ink was prepared in the same manner as in Example 1 except that $(HOC_2H_4)_2NC_2H_4SO_3H$ in Example 1 was changed to glycine. The prepared ink had a pH of 10.2.

Comparative Example 13

An ink was prepared in the same manner as in Example 1 except that $(HOC_2H_4)_2NC_2H_4SO_3H$ in Example 1 was changed to $C_6H_{11}NH(CH_2)_3SO_3H$. The prepared ink had a pH of 11.6.

Comparative Example 14

| | |
|---|---|
| ammonium salt of compound (VI-2) dye | 3.5 parts by weight |
| diethylene glycol | 15 parts by weight |
| 2-(2-butoxyethoxy)ethanol | 7 parts by weight |
| $(HOCH_2)_3CNH(CH_2)_2SO_3H$ | 0.5 parts by weight |
| sodium tetraborate | 0.65 parts by weight |
| ethyleneurea (vaporization rate: 98% by weight) | 3 parts by weight |
| nonionic surfactant (Tradename: pluronic PE4300 manufactured by BASF) | 0.1 part by weight |
| ion-exchanged water | 68.25 parts by weight |
| (Total: 98 parts by weight) | |

The above-described components were mixed sufficiently, then filtered under pressure using a 0.45 μm filter to prepare an ink. The prepared ink had pH 8.5.

The following evaluations were made using the inks of Examples 1 to 22, and Comparative Examples 1 to 11. Results are shown in Tables 2 to 5.

1) pH pH was measured by a pH meter (manufactured by Horiba Ltd.) under conditions of 20° C. and 50% RH.

The following evaluations were conducted using a prototyped ink jet recording head (constituent materials are composed of silicon, polyimides, epoxy compounds, and the like) and a thermal ink jet printer equipped with the head. The drive condition of the recording head included a driving voltage of 30 V, a resistance of a heat generating resist of 180 Ω and a frequency of 5 kHz, and driving pulse of print discharge according to recording signals and driving pulse of predischarge were conducted under the following conditions: The number of pulse for predischarge was $1 \times 10^5$ when the number of pulse for print discharge reached $1 \times 10^7$.

TABLE 1

| Discharge | Pre-pulse (μs) | Interval (μs) | Main pulse (μs) |
|---|---|---|---|
| print | 0.5 | 1.0 | 4.8 |
| pre | 1.0 | 1.0 | 3.8 |

2) Water resistance

A solid image was printed on FX-L paper (manufactured by Fuji Xerox Co., Ltd.) and Xerox 4024 paper (manufactured by Xerox Co., Ltd.) using the prototype thermal ink jet printer, and the density of the solid image was measured using a Machbeth densitometer. After completion of printing, the print was left as is for 24 hours, then immersed in water for 3 minutes and took out and dried, then, the density was measured again, and the density remaining ratio of the printed image was calculated and used as an index of water resistance.

○ The density remaining ratio is 85% or more.

Δ The density remaining ratio is more than 50 and less than 85%.

× The density remaining ratio is 50% or less.

3) Clogging

The prototype ink jet recording head was left open in an atmosphere of 10° C., 15%RH, and 30° C., 85%RH, for aspecific time, then a discharge test was conducted and evaluated according to the following criteria:

○ Dischargeable after left for 300 seconds

Δ Dischargeable after left for 180 seconds

× Undischargeable after left for 180 seconds

4) Discharge recoverability

The prototype ink jet recording head was filled with an ink, left in an atmosphere of 10° C., 15%RH, and 30° C., 85%RH, for two months, then recovery operation was conducted with an absorbing pump, then printing was conducted to evaluate whether normal printing was possible.

○ Normal printing was possible within 3 recovery tries.

Δ Normal printing was possible after 4 to 8 recovery tries.

× Normal printing was not possible after 4 to 8 recovery tries.

5) Image quality

English and number characters and a solid image were printed on FX-L paper (manufactured by Fuji Xerox Co., Ltd.) and Xerox 4024 paper (manufactured by Xerox Co., Ltd.) using the prototype thermal ink jet printer, and blotting and bronzing of the resultant image were evaluated by human sense.

Blotting evaluation

○ Negligible blotting, sharp image

Δ Some blotting

× Heavy blotting, illegible

Bronzing evaluation

○ Negligible reddish in solid black image, negligible fogging in solid color image Δ Noticeable reddish in solid black image, noticeable fogging in solid color image × Unacceptable reddish in solid black image, unacceptable fogging in solid color image Dropout evaluation (evaluation of jetting frequency response)

○ No dropout in solid image or continuous image

Δ Negligible dropout in solid image

× Unacceptable dropout in solid image

6) Stability with respect to environmental change

The prototype ink jet recording head was filled with an ink, stored for 48 hours at 40° C., then stored for 24 hours at 20° C., subsequently stored for 48 hours at −10° C., then stored for 24 hours at 20° C. (1 cycle). This cycle was repeated 4 times, and recovery by an absorbing pump was conducted and then printing was conducted to evaluate whether normal printing was possible.

○ Normal printing was possible within 3 recovery tries.

Δ Normal printing was possible after 4 to 8 recovery tries.

× Normal printing was not possible after 4 to 8 recovery tries.

7) Continuous droplet test (burnt deposition on heater, heater failure)

Continuous droplet testing was conducted using the prototype ink jet printer, and the ink droplet amount was measured when the number of pulse reached 1×10$^8$. Burnt deposition on a heater was evaluated by comparing the initial droplet amount with the following criteria:

○ Variation in droplet amount is less than ±10%, there is no dropout and no discontinuity in image.

Δ variation in droplet amount is from ×10% to less than ±20%, ratio of dropout and discontinuity notable in image is less than 5%.

× Unacceptable variation in droplet amount is ±20% or more, ratio of dropout and discontinuity in image is 5% or less.

Simultaneously, heater failure was evaluated as follows:

○ Occurrence

× No occurrence

TABLE 2

| Example | Water resistance | | Clogging | Discharge recoverability after left for a long period of time |
|---|---|---|---|---|
| | L paper | 4024 paper | | |
| 1 | ○ | ○ | ○ | ○ |
| 2 | ○ | ○ | ○ | ○ |
| 3 | ○ | ○ | ○ | ○ |
| 4 | ○ | ○ | ○ | Δ |
| 5 | ○ | ○ | ○ | Δ |
| 6 | ○ | ○ | ○ | ○ |
| 7 | ○ | ○ | ○ | Δ |
| 8 | ○ | ○ | ○ | Δ |
| 9 | ○ | ○ | ○ | Δ |
| 10 | ○ | ○ | ○ | ○ |
| 11 | ○ | ○ | ○ | ○ |
| 12 | ○ | ○ | ○ | ○ |
| 13 | ○ | ○ | ○ | Δ |
| 14 | ○ | ○ | Δ | Δ |
| 15 | ○ | ○ | Δ | Δ |
| 16 | ○ | ○ | Δ | Δ |
| 17 | ○ | ○ | ○ | ○ |
| 18 | ○ | ○ | ○ | ○ |
| 19 | ○ | Δ | ○ | ○ |
| 20 | ○ | Δ | ○ | ○ |
| 21 | ○ | Δ | ○ | ○ |
| 22 | ○ | Δ | ○ | ○ |

TABLE 3

| Comparative Example | Water resistance | | Clogging | Discharge recoverability after left for a long period of time |
|---|---|---|---|---|
| | L paper | 4024 paper | | |
| 1 | ○ | ○ | X | X |
| 2 | ○ | ○ | Δ | X |
| 3 | ○ | ○ | Δ | Δ |
| 4 | ○ | ○ | Δ | X |
| 5 | ○ | ○ | X | X |
| 6 | ○ | ○ | Δ | X |
| 7 | X | X | ○ | ○ |
| 8 | X | X | ○ | Δ |
| 9 | X | X | ○ | Δ |
| 10 | ○ | ○ | X | X |
| 11 | ○ | ○ | ○ | Δ |
| 12 | ○ | ○ | ○ | ○ |
| 13 | ○ | Δ | ○ | ○ |
| 14 | ○ | ○ | Δ | Δ |

TABLE 4

| | Image quality (blotting) | | Image quality (dropout) | | Image quality (bronzing) | | Stability with respect to environmental change | Continuous discharge test | |
|---|---|---|---|---|---|---|---|---|---|
| Example | L paper | 4024 paper | L paper | 4024 paper | L paper | 4024 paper | | Burnt deposition | Heater failure |
| 1 | ○ | ○ | ○ | ○ | ○ | ○ | ○ | ○ | ○ |
| 2 | ○ | ○ | ○ | ○ | ○ | ○ | ○ | ○ | ○ |
| 3 | ○ | ○ | ○ | ○ | ○ | ○ | ○ | ○ | ○ |
| 4 | ○ | ○ | ○ | ○ | ○ | ○ | ○ | ○ | ○ |
| 5 | ○ | ○ | ○ | ○ | ○ | ○ | ○ | ○ | ○ |
| 6 | ○ | ○ | ○ | ○ | ○ | ○ | ○ | ○ | ○ |
| 7 | ○ | ○ | Δ | Δ | ○ | ○ | ○ | ○ | ○ |
| 8 | ○ | ○ | ○ | ○ | ○ | ○ | ○ | ○ | ○ |

TABLE 4-continued

| Ex-ample | Image quality (blotting) | | Image quality (dropout) | | Image quality (bronzing) | | Stability with respect to environmental change | Continuous discharge test | |
|---|---|---|---|---|---|---|---|---|---|
| | L paper | 4024 paper | L paper | 4024 paper | L paper | 4024 paper | | Burnt deposition | Heater failure |
| 9  | ○ | ○ | ○ | ○ | ○ | ○ | ○ | ○ | ○ |
| 10 | ○ | ○ | ○ | ○ | ○ | ○ | ○ | ○ | ○ |
| 11 | ○ | ○ | ○ | ○ | ○ | ○ | ○ | ○ | ○ |
| 12 | ○ | ○ | ○ | ○ | ○ | ○ | ○ | ○ | ○ |
| 13 | ○ | ○ | ○ | ○ | ○ | ○ | ○ | ○ | ○ |
| 14 | ○ | Δ | ○ | ○ | ○ | ○ | ○ | ○ | ○ |
| 15 | Δ | ○ | Δ | Δ | ○ | ○ | ○ | ○ | ○ |
| 16 | ○ | Δ | ○ | ○ | ○ | ○ | ○ | ○ | ○ |
| 17 | ○ | ○ | Δ | Δ | ○ | ○ | ○ | ○ | ○ |
| 18 | ○ | ○ | ○ | ○ | ○ | ○ | ○ | ○ | ○ |
| 19 | ○ | ○ | ○ | ○ | ○ | ○ | ○ | ○ | ○ |
| 20 | ○ | ○ | ○ | ○ | ○ | ○ | ○ | ○ | ○ |
| 21 | ○ | ○ | ○ | ○ | ○ | ○ | ○ | ○ | ○ |
| 22 | ○ | ○ | ○ | ○ | ○ | ○ | ○ | ○ | ○ |

TABLE 5

| Comparative Example | Image quality (blotting) | | Image quality (dropout) | | Image quality (bronzing) | | Stability with respect to environmental change | Continuous discharge test | |
|---|---|---|---|---|---|---|---|---|---|
| | L paper | 4024 paper | L paper | 4024 paper | L paper | 4024 paper | | Burnt | Heater failure |
| 1  | Δ | Δ | X | X | X | X | Δ | X | ○ |
| 2  | Δ | Δ | X | X | Δ | X | Δ | X | ○ |
| 3  | Δ | Δ | X | X | Δ | Δ | Δ | ○ | ○ |
| 4  | Δ | Δ | Δ | Δ | Δ | X | Δ | Δ | ○ |
| 5  | Δ | Δ | X | X | Δ | X | X | Δ | ○ |
| 6  | Δ | Δ | Δ | Δ | ○ | ○ | X | ○ | ○ |
| 7  | ○ | ○ | ○ | ○ | ○ | ○ | ○ | ○ | ○ |
| 8  | ○ | ○ | ○ | ○ | ○ | ○ | ○ | ○ | ○ |
| 9  | ○ | ○ | ○ | ○ | ○ | ○ | ○ | ○ | ○ |
| 10 | ○ | ○ | Δ | Δ | X | X | X | X | ○ |
| 11 | ○ | ○ | Δ | Δ | ○ | ○ | ○ | Δ | X |
| 12 | ○ | ○ | ○ | ○ | ○ | ○ | ○ | X | X |
| 13 | ○ | ○ | X | X | ○ | ○ | ○ | Δ | ○ |
| 14 | Δ | Δ | Δ | Δ | ○ | Δ | Δ | X | ○ |

It is recognized from the above tables that the inks of the present examples are excellent in water resistance, image quality, and nozzle clogging resistance, have sufficient responsiveness for pulses applied to a recording head, can provide stable dischargeability for a long time, are excellent in long storage stability, do not corrode parts such as a recording head which contact ink, and provide high reliability.

What is claimed is:

1. An ink jet recording ink comprising water, a water-soluble organic solvent, and at least one dye having at least one carboxyl group in the form of a free acid, wherein at least one secondary or tertiary amine compound represented by the following general formula (I) and at least one alkali metal hydroxide is contained and the pH value thereof is from 9.1 to 12:

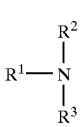

(I)

wherein, one or two of $R^1$, $R^2$, and $R^3$ are an alkyl group having 1 to 5 carbon atoms in the alkyl chain and substituted by a substituent selected from the group consisting of a carboxyl group, a sulfonic group, an alkali metal salt of a carboxyl group, and an alkali metal salt of a sulfonic group; and the remainder is a group selected from the group consisting of a hydrogen atom, an alkyl group having 1 to 5 carbon atoms, and a substituted alkyl group having 1 to 5 carbon atoms in the alkyl chain and substituted by a hydroxyl group or carbamoyl group.

2. The ink jet recording ink according to claim 1, wherein the content of the secondary or tertiary amine compound represented by said general formula (I) is from 0.1 to 8% by weight, and the content of the said alkali metal hydroxide is from 0.05 to 5% by weight.

3. The ink jet recording ink according to claim 1 further comprising an aqueous organic compound which is solid at a normal temperature and 50% or more by weight of the compound vaporizes at a temperature from 100 to 350° C.

4. The ink jet recording ink according to claim 3, wherein the content of said aqueous organic compound is from 1 to 15% by weight.

5. The ink jet recording ink according to claim 3, wherein said aqueous organic compound is at least one compound selected from the group consisting of urea, thiourea, and derivatives thereof.

6. The ink jet recording ink according to claim 1 which further comprises at least one ammonium ion as a counter ion of said dye.

7. The ink jet recording ink according to claim 1, wherein said dye comprises at least one dye represented by a member selected from the group consisting of the following general formulas (II) to (VII) in the form of a free acid:

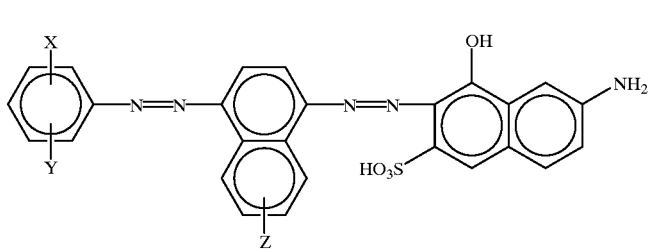

(II)

wherein X and Y are each hydrogen or a carboxyl group; Z is hydrogen, a carboxyl group, or sulfonic group; and general formula (II) has one or more carboxyl groups;

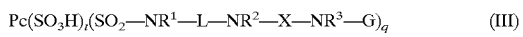

(III)

wherein Pc is a phthalocyanine nucleus containing metal; $R^1$, $R^2$ and $R^3$ are each independently hydrogen, an alkyl group, substituted alkyl group, alkenyl group, substituted alkenyl group, aralkyl group, or substituted aralkyl group; L is a divalent organic bonding group; X is a carbonyl group or a group represented by formulas (1) to (3); G is a colorless organic group substituted by one or two groups selected from a mercaptocarbonyl group or carboxyl group; t+q is 3 to 4; q is 1 or more; and general formula (III) has 1 or more carboxyl groups and 1 or more sulfonic groups; and the sum of the number of the mercaptocarboxyl group and the number of the carboxyl group is equal to or greater than the number of the sulfonic group;

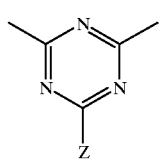

(1)

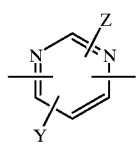

(2)

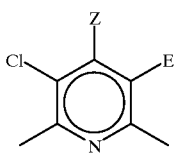

(3)

wherein in formulas (1) to (3), Z is $NR^4NR^5$, $SR^6$, or $OR^6$; Y is hydrogen, chlorine, Z, $SR^7$, or $OR^7$; E is chlorine or a cyano group; $R^4$ and $R^5$ are each independently hydrogen, an alkyl group, substituted alkyl group, aryl group, substituted aryl group, aralkyl group, or substituted aralkyl group, or a group constituting a 5- or 6-member ring together with a nitrogen atom; and $R^6$ and $R^7$ are each independently hydrogen, an alkyl group, substituted alkyl group, aryl group, substituted aryl group, aralkyl group, or substituted aralkyl group;

(IV)

wherein J is a group represented by formula (1) described below; $Ar^1$ and $Ar^2$ are each independently an aryl group or substituted aryl group; at least one of $Ar^1$ and $Ar^2$ has at least one substituent selected from a mercaptocarbonyl group or carboxyl group; L is a divalent organic bonding group; X is a carbonyl group or a group represented by formulas (2) to (4) below; and general formula (IV) has 1 or more carboxyl groups and 1 or more sulfonic groups and the sum of the number of the mercaptocarboxyl group and the number of the carboxyl group is equal to or greater than the number of sulfonic group;

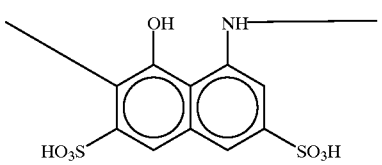

(1)

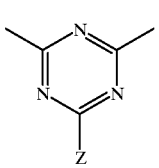

(2)

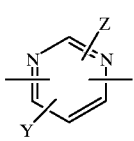

(3)

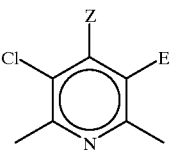

(4)

wherein in formulas (2) to (4), Z is $NR^1R^2$, $SR^3$, or $OR^3$; Y is hydrogen, chlorine, Z, $SR^4$, or $OR^4$; E is chlorine or a cyano group; $R^1$ and $R^2$ are each independently hydrogen, an alkyl group, substituted alkyl group, alkenyl group, substituted alkenyl group, aralkyl group, or substituted aralkyl group or a group constituting a 5- or 6-member ring together with a nitrogen atom; and $R^3$ and $R^4$ are each independently hydrogen, an alkyl group, substituted alkyl group, alkenyl group, substituted alkenyl group, aralkyl group, or substituted aralkyl group;

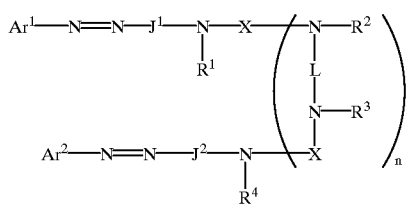
(V)

wherein, $Ar^1$ and $Ar^2$ are each independently an aryl group, or substituted aryl group; at least one of $Ar^1$ and $Ar^2$ has at least one substituent selected from a mercaptocarbonyl group or carboxyl group; $J^1$ and $J^2$ are each independently a group selected from the group consisting of a group represented by formulas (1) to (3) described below; $R^1$, $R^2$, $R^3$ and $R^4$ are each independently hydrogen, an alkyl group, or substituted alkyl group; L is a divalent organic bonding group; n is 0 or 1; X is independently a carbonyl group or a group selected from the group consisting of a group represented by formulas (4) to (6) described below, and general formula (V) has 1 or more carboxyl groups; and when general formula (V) does not have a sulfonic group, the sum of the number of the mercaptocarbonyl group and the number of the carboxyl group is two or more and when general formula (V) has a sulfonic group, the sum of the number of the mercaptocarboxyl group and the number of the carboxyl group is equal to or greater-than the number of the sulfonic group;

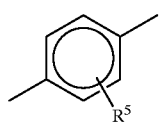
(1)

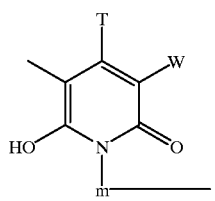
(2)

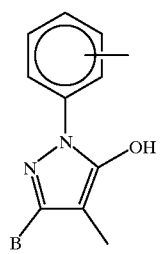
(3)

wherein in formulas (1) to (3), $R^5$ is hydrogen, an alkyl group, substituted alkyl group, alkoxyhalogen, cyano group, ureido, or $NHCOR^6$; $R^6$ is hydrogen, an alkyl group, substituted alkyl group, aryl group, substituted aryl group, aralkyl group, or substituted aralkyl group; T is an alkyl group; W is hydrogen, a cyano group, $CONR^{10}R^{11}$, pyridinium group, or carboxyl group; m is a $C_2$ to $C_8$ alkylene chain; B is hydrogen, an alkyl group, or carboxyl group; and $R^{10}$ and $R^{11}$ are each independently hydrogen, an alkyl group, or substituted alkyl group;

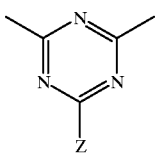
(4)

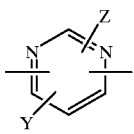
(5)

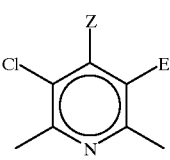
(6)

wherein in formulas (4) to (6); Z is $OR^7$, $SR^7$, or $NR^8R^9$; Y is hydrogen, chlorine, or a cyano group; E is chlorine or a cyano group; $R^7$ is hydrogen, an alkyl group, substituted alkyl group, alkenyl group, substituted alkenyl group, aryl group, substituted aryl group, aralkyl group, or substituted aralkyl group; $R^8$ and $R^9$ are each independently hydrogen, an alkyl group, substituted alkyl group, alkenyl group, substituted alkenyl group, aryl group, substituted aryl group, aralkyl group or substituted aralkyl group, or a group constituting a 5- or 6-member ring together with a nitrogen atom;

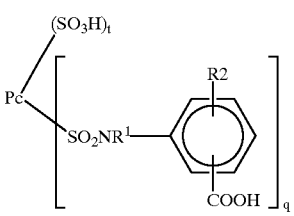
(VI)

wherein Pc is a phthalocyanine nucleus containing metal; $R^1$ is hydrogen, an alkyl group, substituted alkyl group, alkenyl group, substituted alkenyl group, aralkyl group, or substituted aralkyl group; $R^2$ is hydrogen, an alkyl group, alkoxy group, halogen group, amino group, or substituted amino group; t+q is 3 to 4; and q is 1 or more;

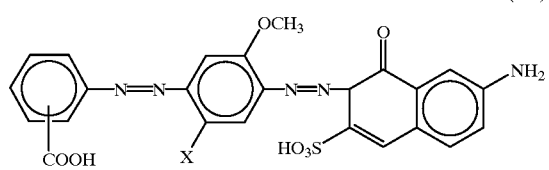
(VII)

wherein X is hydrogen, a carboxyl group, sulfonic group, alkyl group, substituted alkyl group, alkenyl group, substituted alkenyl group, aralkyl group, or substituted aralkyl group.

8. The ink jet recording ink according to claim 1, wherein the content of said dye is from 0.3 to 10% by weight.

9. The ink jet recording ink according to claim 1, wherein the content of said aqueous organic solvent is from 3 to 40% by weight.

10. The ink jet recording ink according to claim 1, wherein said aqueous organic solvent comprises at least one compound selected from the group consisting of polyhydric alcohols, polyglycols, and polyglycol ethers.

11. The ink jet recording ink according to claim 1 which further comprises a surfactant.

12. The ink jet recording ink according to claim 7, wherein said dye comprises at least one dye selected from the group consisting of a dye represented by one of the following structural formulas (VIII) to (XI):

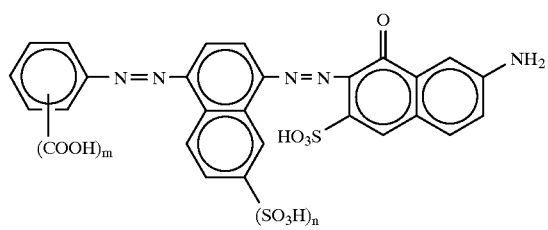

(VIII)

wherein m is 1 or 2, and n is 0 or 1;

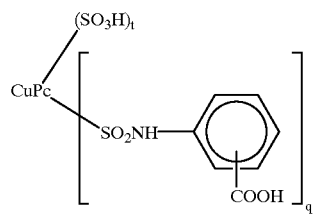

(IX)

wherein CuPc is a phthalocyanine nucleus containing copper, and t+q is 3 to 4;

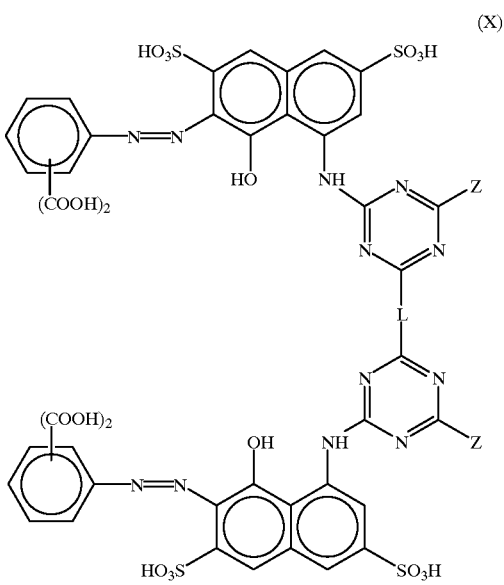

(X)

wherein L is a divalent organic bonding group; Z is $NR^2R^2$, $SR^3$, or $OR^3$; $R^1$ and $R^2$ are each independently hydrogen, an alkyl group, substituted alkyl group, alkenyl group, substituted alkenyl group, aralkyl group, or substituted aralkyl group or a group constituting a 5- or 6-member ring together with a nitrogen atom, and $R^3$ is hydrogen, an alkyl group, substituted alkyl group, alkenyl group, substituted alkenyl group, aralkyl group, or substituted aralkyl group;

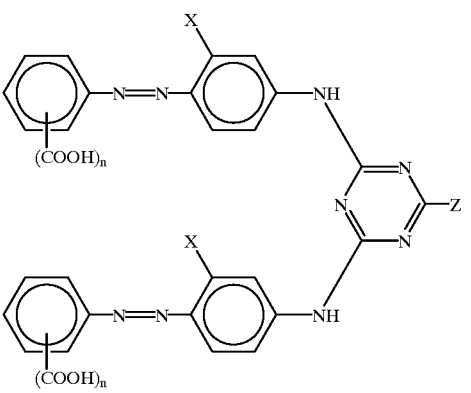

(XI)

wherein n is 1 or 2; X is hydrogen, an alkyl group, substituted alkyl group, alkoxyhalogen, cyano group, ureido, or $NHCOR^1$; $R^1$ is hydrogen, an alkyl group, substituted alkyl group, aryl group, substituted aryl group, aralkyl group, or substituted aralkyl group; Z is $OR^2$, $SR^2$, or $NR^3R^4$; $R^2$ is hydrogen, an alkyl group, substituted alkyl group, alkenyl group, substituted alkenyl group, aryl group, substituted aryl group, aralkyl group, or substituted aralkyl group; $R^3$ and $R^4$ are each independently hydrogen, an alkyl group, substituted alkyl group, alkenyl group, substituted alkenyl group, aryl group, substituted aryl group, aralkyl group, or substituted aralkyl group or a group constituting a 5- or 6-member ring together with a nitrogen atom.

13. An ink jet recording method in which ink droplets are discharged from an orifice according to a recording signal to conduct recording, wherein said ink comprises the ink jet recording ink of claim 1.

14. The ink jet recording method according to claim 13, wherein said ink droplets are formed by heating the ink with heating means.

15. The ink jet recording method according to claim 14, wherein said ink droplets are formed by applying a plurality of pulses to said heating means.

16. The ink jet recording method according to claim 14, wherein the surrounding material of said heating means is made of a polyimide-based resin.

17. The ink jet recording method according to claim 13 comprising a recording process in which ink droplets discharged from an orifice are used for recording on a recording medium, and a predischarge process in which ink droplets discharged from an orifice are not used for recording on a recording medium.

* * * * *